(12) United States Patent
Suzuki et al.

(10) Patent No.: US 10,647,178 B2
(45) Date of Patent: May 12, 2020

(54) AIR CONDITIONER FOR VEHICLE

(71) Applicant: SANDEN AUTOMOTIVE CLIMATE SYSTEMS CORPORATION, Isesaki-shi (JP)

(72) Inventors: Kenichi Suzuki, Isesaki (JP); Ryo Miyakoshi, Isesaki (JP); Kohei Yamashita, Isesaki (JP)

(73) Assignee: SANDEN AUTOMOTIVE CLIMATE SYSTEMS CORPORATION, Gunma (JP)

( * ) Notice: Subject to any disclaimer, the term of this patent is extended or adjusted under 35 U.S.C. 154(b) by 34 days.

(21) Appl. No.: 15/738,857

(22) PCT Filed: Jun. 7, 2016

(86) PCT No.: PCT/JP2016/066858
§ 371 (c)(1),
(2) Date: Dec. 21, 2017

(87) PCT Pub. No.: WO2017/002547
PCT Pub. Date: Jan. 5, 2017

(65) Prior Publication Data
US 2018/0178629 A1 Jun. 28, 2018

(30) Foreign Application Priority Data
Jul. 1, 2015 (JP) ................................. 2015-132541

(51) Int. Cl.
*B60H 1/00* (2006.01)
*B60H 1/32* (2006.01)
(Continued)

(52) U.S. Cl.
CPC ..... *B60H 1/00921* (2013.01); *B60H 1/00385* (2013.01); *B60H 1/00792* (2013.01);
(Continued)

(58) Field of Classification Search
CPC .. B60H 1/00385; B60H 1/32; B60H 1/00792; B60H 1/00885; B60H 1/00921;
(Continued)

(56) References Cited

U.S. PATENT DOCUMENTS

2011/0146320 A1* 6/2011 Tomiyama ........... B60H 1/3208
62/296
2012/0291467 A1* 11/2012 Sasaki ................. B60H 1/3208
62/151

FOREIGN PATENT DOCUMENTS

| CN | 1288828 | 3/2001 |
|---|---|---|
| CN | 101684791 | 3/2010 |

(Continued)

OTHER PUBLICATIONS

Notice of Reasons for Refusal dated Jun. 12, 2019 issued in Japanese Patent Application No. 2015-132541.
(Continued)

*Primary Examiner* — Frantz F Jules
*Assistant Examiner* — Martha Tadesse
(74) *Attorney, Agent, or Firm* — Cozen O'Connor

(57) ABSTRACT

Heat pump type air conditioner for a vehicle in which a noise generated in opening an opening/closing valve (a solenoid valve) during changing of an operation mode is eliminated or reduced. The air conditioner has a dehumidifying and heating mode to let a refrigerant radiate heat in a radiator 4, decompress the refrigerant, and let the refrigerant absorb heat in heat absorber 9 and outdoor heat exchanger 7, and a cooling mode to let the refrigerant radiate heat in the outdoor heat exchanger, decompress the refrigerant, and let the refrigerant absorb heat in the heat absorber. Solenoid valve 21 and solenoid valve 22 opened in the dehumidifying and heating mode. When changing an operation mode from the cooling mode to the dehumidifying and heating mode, a difference between a pressure before each solenoid valve
(Continued)

and a pressure after the valve is reduced, and then these valves are opened.

7 Claims, 13 Drawing Sheets

(51) Int. Cl.
*F25B 41/00* (2006.01)
*F25B 13/00* (2006.01)
*F25B 40/02* (2006.01)

(52) U.S. Cl.
CPC .......... *B60H 1/00885* (2013.01); *B60H 1/32* (2013.01); *B60H 1/3213* (2013.01); *F25B 13/00* (2013.01); *F25B 40/02* (2013.01); *F25B 41/00* (2013.01); *B60H 2001/006* (2013.01); *B60H 2001/3248* (2013.01); *B60H 2001/3272* (2013.01); *B60H 2001/3285* (2013.01); *F25B 2700/1931* (2013.01); *F25B 2700/21151* (2013.01); *F25B 2700/21152* (2013.01)

(58) Field of Classification Search
CPC ............ B60H 1/3213; B60H 2001/006; B60H 2001/3272; B60H 2001/3248; B60H 2001/3285; F25B 13/00; F25B 41/00; F25B 40/02; F25B 2700/1931; F25B 2700/21151; F25B 2700/21152
See application file for complete search history.

(56) References Cited

FOREIGN PATENT DOCUMENTS

| | | | | |
|---|---|---|---|---|
| EP | 2727754 A1 | * | 5/2014 | ......... B60H 1/00899 |
| JP | S 62-155120 | | 7/1987 | |
| JP | 2003-279180 | | 10/2003 | |
| JP | 2011-126409 | | 6/2011 | |
| JP | 2012-250708 | | 12/2012 | |
| JP | 2012250708 A | * | 12/2012 | |
| JP | 2013-180743 | | 9/2013 | |
| JP | 2014-62675 | | 4/2014 | |
| JP | 2014-088151 | | 5/2014 | |
| JP | 2014-88154 | | 5/2014 | |
| JP | 2014-94671 | | 5/2014 | |
| JP | 2014094671 A | * | 5/2014 | ........... B60H 1/3204 |

OTHER PUBLICATIONS

Office Action dated Sep. 24, 2019 issued in Chinese Patent Application No. 201680037737.8.

* cited by examiner

FIG. 3

|  | COOLING (DEHUMIDIFYING AND COOLING) | DEHUMIDIFYING AND HEATING | PRESSURE DIFFERENCE DURING CHANGING |
|---|---|---|---|
| OUTDOOR EXPANSION VALVE (6) | FULLY OPENED TO CONTROLLED | CONTROLLED | NONE TO SMALL |
| SOLENOID VALVE (20) | OPENED (CLOSED) | CLOSED | NONE TO SMALL |
| SOLENOID VALVE (21) | CLOSED | OPENED | MEDIUM TO SMALL |
| SOLENOID VALVE (17) | OPENED | CLOSED | NONE TO SMALL |
| SOLENOID VALVE (22) | CLOSED | OPENED | MEDIUM TO SMALL |
| EVAPORATION CAPABILITY CONTROL VALVE (11) | OPENED | OPENED/CLOSED | – |

FIG. 5

|  | COOLING (DEHUMIDIFYING AND COOLING) | INTERNAL CYCLE | PRESSURE DIFFERENCE DURING CHANGING |
|---|---|---|---|
| OUTDOOR EXPANSION VALVE (6) | FULLY OPENED TO CONTROLLED | FULLY CLOSED | NONE TO SMALL |
| SOLENOID VALVE (20) | OPENED (CLOSED) | CLOSED | NONE TO SMALL |
| SOLENOID VALVE (21) | CLOSED | CLOSED | -- |
| SOLENOID VALVE (17) | OPENED | CLOSED | NONE TO SMALL |
| SOLENOID VALVE (22) | CLOSED | OPENED | MEDIUM TO SMALL |
| EVAPORATION CAPABILITY CONTROL VALVE (11) | OPENED | OPENED | -- |

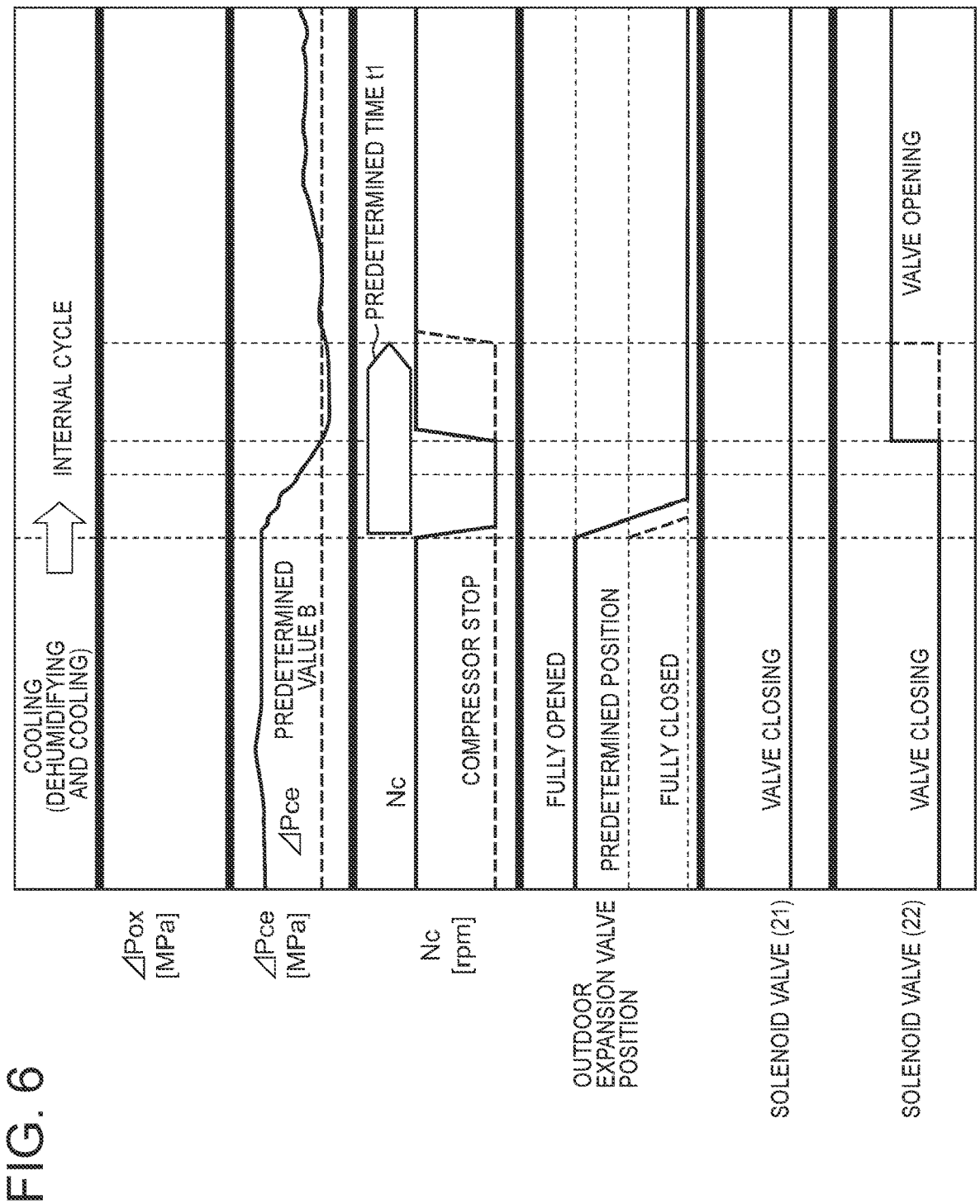

FIG. 7

|  | COOLING (DEHUMIDIFYING AND COOLING) | HEATING | PRESSURE DIFFERENCE DURING CHANGING |
|---|---|---|---|
| OUTDOOR EXPANSION VALVE (6) | FULLY OPENED TO CONTROLLED | CONTROLLED | NONE TO SMALL |
| SOLENOID VALVE (20) | OPENED (CLOSED) | CLOSED | NONE TO SMALL |
| SOLENOID VALVE (21) | CLOSED | OPENED | MEDIUM TO SMALL |
| SOLENOID VALVE (17) | OPENED | CLOSED | NONE TO SMALL |
| SOLENOID VALVE (22) | CLOSED | CLOSED | – |
| EVAPORATION CAPABILITY CONTROL VALVE (11) | OPENED | OPENED | – |

FIG. 9

|  | INTERNAL CYCLE | DEHUMIDIFYING AND HEATING | PRESSURE DIFFERENCE DURING CHANGING |
|---|---|---|---|
| OUTDOOR EXPANSION VALVE (6) | FULLY CLOSED | CONTROLLED | MEDIUM TO SMALL |
| SOLENOID VALVE (20) | CLOSED | CLOSED | − |
| SOLENOID VALVE (21) | CLOSED | OPENED | MEDIUM TO SMALL |
| SOLENOID VALVE (17) | CLOSED | CLOSED | − |
| SOLENOID VALVE (22) | OPENED | OPENED | − |
| EVAPORATION CAPABILITY CONTROL VALVE (11) | OPENED | OPENED/CLOSED | − |

FIG. 11

|  | INTERNAL CYCLE | HEATING | PRESSURE DIFFERENCE DURING CHANGING |
|---|---|---|---|
| OUTDOOR EXPANSION VALVE (6) | FULLY CLOSED | CONTROLLED | MEDIUM TO LARGE |
| SOLENOID VALVE (20) | CLOSED | CLOSED | – |
| SOLENOID VALVE (21) | CLOSED | OPENED | MEDIUM TO SMALL |
| SOLENOID VALVE (17) | CLOSED | CLOSED | – |
| SOLENOID VALVE (22) | OPENED | CLOSED | NONE TO SMALL |
| EVAPORATION CAPABILITY CONTROL VALVE (11) | OPENED | OPENED | – |

AIR CONDITIONER FOR VEHICLE

RELATED APPLICATIONS

This is a U.S. National Phase Application under 35 USC 371 of International Application PCT/JP2016/066858 filed on Jun. 7, 2016.

This application claims the priority of Japanese application no. 2015-132541 filed Jul. 1, 2015, the entire content of which is hereby incorporated by reference.

TECHNICAL FIELD

The present invention relates to an air conditioner of a heat pump system which conditions air of a vehicle interior, and more particularly, it relates to an air conditioner for a vehicle which is suitable for a hybrid car or an electric vehicle.

BACKGROUND ART

Due to actualization of environmental problems in recent years, hybrid cars and electric vehicles have spread. Then, as an air conditioner which is applicable to such a vehicle, there has been developed an air conditioner including a compressor to compress and discharge a refrigerant, a radiator disposed on a vehicle interior side to let the refrigerant radiate heat, a heat absorber disposed on the vehicle interior side to let the refrigerant absorb heat, and an outdoor heat exchanger disposed outside the vehicle interior to let the refrigerant radiate heat or absorb heat, and there are changed and executed respective operation modes of a heating mode to let the refrigerant discharged from the compressor radiate heat in the radiator and let the refrigerant from which the heat has been radiated in this radiator absorb heat in the outdoor heat exchanger, a dehumidifying and heating mode to let the refrigerant discharged from the compressor radiate heat in the radiator and let the refrigerant from which the heat has been radiated in the radiator absorb heat in the heat absorber and the outdoor heat exchanger, an internal cycle mode to let the refrigerant discharged from the compressor radiate heat in the radiator, decompress the refrigerant from which the heat has been radiated, and let the refrigerant absorb heat in the heat absorber, a dehumidifying and cooling mode to let the refrigerant discharged from the compressor radiate heat in the radiator and the outdoor heat exchanger, decompress the refrigerant from which the heat has been radiated, and let the refrigerant absorb heat in the heat absorber, and a cooling mode to let the refrigerant discharged from the compressor radiate heat in the outdoor heat exchanger, decompress the refrigerant from which the heat has been radiated, and let the refrigerant absorb heat in the heat absorber (e.g., see Patent Document 1).

CITATION LIST

Patent Documents

Patent Document 1: Japanese Patent Application Publication No. 2014-94671
Patent Document 2: Japanese Patent Application Publication No. 2014-88151

SUMMARY OF THE INVENTION

Problems to be Solved by the Invention

In such an air conditioner for a vehicle as described above in Patent Document 1, a solenoid valve (an opening/closing valve) for heating is provided between an outlet of an outdoor heat exchanger and an accumulator on a suction side of a compressor, and this solenoid valve for the heating is opened when the above cooling mode or dehumidifying and cooling mode is changed to a dehumidifying and heating mode, but a difference between a pressure before the solenoid valve and a pressure after the valve during this changing is large, and hence a comparatively loud noise is generated by a refrigerant rapidly flowing (through the accumulator) on the suction side of the compressor during the opening of the solenoid valve.

Furthermore, a solenoid valve (an opening/closing valve) for dehumidifying is provided in parallel with the outdoor heat exchanger, and the solenoid valve for the dehumidifying is opened when the above cooling mode or dehumidifying and cooling mode is changed to an internal cycle mode, but a difference between a pressure before the solenoid valve and a pressure after the valve during this changing is also large, and hence a loud noise is similarly generated by the refrigerant rapidly flowing on a heat absorber side during the opening of the solenoid valve.

Here, an air conditioner has been suggested in which when the heating and cooling are changed, a pressure difference between a high pressure side of a refrigerant circuit and a low pressure side thereof is decreased, and then the solenoid valve is opened, to inhibit generation of an abnormal noise (e.g., see Patent Document 2).

The present invention has been developed in view of such conventional circumstances, and an object thereof is to provide a so-called heat pump type air conditioner for a vehicle in which a noise generated in opening an opening/closing valve during changing of an operation mode is eliminated or reduced.

Means for Solving the Problems

An air conditioner for a vehicle of the invention of claim 1 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant radiate heat or absorb heat, and a control means, so that this control means changes and executes at least operation modes of a dehumidifying and heating mode to let the refrigerant discharged from the compressor radiate heat in the radiator, decompress the refrigerant from which the heat has been radiated, and let the refrigerant absorb heat in the heat absorber and the outdoor heat exchanger, a dehumidifying and cooling mode to let the refrigerant discharged from the compressor radiate heat in the radiator and the outdoor heat exchanger, decompress the refrigerant from which the heat has been radiated, and let the refrigerant absorb heat in the heat absorber, and a cooling mode to let the refrigerant discharged from the compressor radiate heat in the outdoor heat exchanger, decompress the refrigerant from which the heat has been radiated, and let the refrigerant absorb heat in the heat absorber, and the air conditioner for the vehicle further includes an opening/closing valve for heating which is connected to an outlet side of the outdoor heat exchanger and is opened in the dehumidifying and heating mode, and an opening/closing valve for dehumidifying which is connected in parallel with the outdoor heat exchanger and is opened in the dehumidifying and heating mode, and the air conditioner for the vehicle is characterized in that when the control means changes the operation mode from the cooling mode and/or the dehumidifying and cooling mode to the dehumidifying and heating mode, the control means executes noise improvement control to reduce a difference between a pressure before each opening/closing valve and a pressure after the valve and then to open the opening/closing valve.

An air conditioner for a vehicle of the invention of claim 2 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant radiate heat or absorb heat, and a control means, so that this control means changes and executes at least operation modes of an internal cycle mode to let the refrigerant discharged from the compressor radiate heat in the radiator, decompress the refrigerant from which the heat has been radiated, and let the refrigerant absorb heat in the heat absorber, a dehumidifying and cooling mode to let the refrigerant discharged from the compressor radiate heat in the radiator and the outdoor heat exchanger, decompress the refrigerant from which the heat has been radiated, and let the refrigerant absorb heat in the heat absorber, and a cooling mode to let the refrigerant discharged from the compressor radiate heat in the outdoor heat exchanger, decompress the refrigerant from which the heat has been radiated, and let the refrigerant absorb heat in the heat absorber, and the air conditioner for the vehicle further includes an opening/closing valve for dehumidifying which is connected in parallel with the outdoor heat exchanger and is opened in the internal cycle mode, and the air conditioner for the vehicle is characterized in that when the control means changes the operation mode from the cooling mode and/or the dehumidifying and cooling mode to the internal cycle mode, the control means executes noise improvement control to reduce a difference between a pressure before the opening/closing valve and a pressure after the valve and then to open the opening/closing valve.

An air conditioner for a vehicle of the invention of claim 3 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant radiate heat or absorb heat, and a control means, so that this control means changes and executes at least operation modes of a heating mode to let the refrigerant discharged from the compressor radiate heat in the radiator, decompress the refrigerant from which the heat has been radiated, and let the refrigerant absorb heat in the outdoor heat exchanger, a dehumidifying and cooling mode to let the refrigerant discharged from the compressor radiate heat in the radiator and the outdoor heat exchanger, decompress the refrigerant from which the heat has been radiated, and let the refrigerant absorb heat in the heat absorber, and a cooling mode to let the refrigerant discharged from the compressor radiate heat in the outdoor heat exchanger, decompress the refrigerant from which the heat has been radiated, and let the refrigerant absorb heat in the heat absorber, and the air conditioner for the vehicle further includes an opening/closing valve for heating which is connected to an outlet side of the outdoor heat exchanger and is opened in the heating mode, and the air conditioner for the vehicle is characterized in that when the control means changes the operation mode from the cooling mode and/or the dehumidifying and cooling mode to the heating mode, the control means executes noise improvement control to reduce a difference between a pressure before the opening/closing valve and a pressure after the valve and then to open the opening/closing valve.

An air conditioner for a vehicle of the invention of claim 4 includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant radiate heat or absorb heat, and a control means, so that this control means changes and executes at least operation modes of a heating mode to let the refrigerant discharged from the compressor radiate heat in the radiator, decompress the refrigerant from which the heat has been radiated, and let the refrigerant absorb heat in the outdoor heat exchanger, a dehumidifying and heating mode to let the refrigerant discharged from the compressor radiate heat in the radiator, decompress the refrigerant from which the heat has been radiated, and let the refrigerant absorb heat in the heat absorber and the outdoor heat exchanger, and an internal cycle mode to let the refrigerant discharged from the compressor radiate heat in the radiator, decompress the refrigerant from which the heat has been radiated, and let the refrigerant absorb heat in the heat absorber, and the air conditioner for the vehicle further includes an opening/closing valve for heating which is connected to an outlet side of the outdoor heat exchanger and is opened in the heating mode and the dehumidifying and heating mode, and the air conditioner for the vehicle is characterized in that when the control means changes the operation mode from the internal cycle mode to the heating mode and/or the dehumidifying and heating mode, the control means executes noise improvement control to reduce a difference between a pressure before the opening/closing valve and a pressure after the valve and then to open the opening/closing valve.

The air conditioner for the vehicle of the invention of claim 5 is characterized in that in the above respective inventions, the control means decreases a number of revolution of the compressor in the noise improvement control.

The air conditioner for the vehicle of the invention of claim 6 is characterized in that in the inventions of claim 1 to claim 4, the control means stops the compressor in the noise improvement control.

The air conditioner for the vehicle of the invention of claim 7 is characterized in that in the above invention, after elapse of a predetermined time from when the compressor is stopped, the control means opens the opening/closing valve.

The air conditioner for the vehicle of the invention of claim 8 is characterized in that in the invention of claim 5 or claim 6, the control means decreases a number of revolution of the compressor or stops the compressor, reduces the difference between the pressure before the opening/closing valve and the pressure after the valve to a predetermined value or less, and then opens the opening/closing valve.

The air conditioner for the vehicle of the invention of claim 9 is characterized in that in the above invention, the control means increases a predetermined value of the difference between the pressure before the opening/closing valve and the pressure after the valve, as a velocity is higher.

The air conditioner for the vehicle of the invention of claim 10 includes an indoor blower to supply the air to the air flow passage in the invention of claim 8 or claim 9, and is characterized in that the control means increases a predetermined value of the difference between the pressure before the opening/closing valve and the pressure after the valve, as a volume of the air of the indoor blower is larger.

The air conditioner for the vehicle of the invention of claim 11 includes an indoor blower to supply the air to the air flow passage, and an outdoor blower to pass outdoor air through the outdoor heat exchanger in the above respective inventions, and is characterized in that when the control means changes the operation mode, the control means increases a volume of the air of the indoor blower and/or the outdoor blower.

The air conditioner for the vehicle of the invention of claim 12 includes an indoor blower to supply the air to the air flow passage in the above respective inventions, and is characterized in that the control means does not execute the noise improvement control, when a velocity has a predetermined value or more and/or when a volume of the air of the indoor blower has a predetermined value or more.

Advantageous Effect of the Invention

According to the invention of claim 1, an air conditioner for a vehicle includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant radiate heat or absorb heat, and a control means, so that this control means changes and executes at least operation modes of a dehumidifying and heating mode to let the refrigerant discharged from the compressor radiate heat in the radiator, decompress the refrigerant from which the heat has been radiated, and let the refrigerant absorb heat in the heat absorber and the outdoor heat exchanger, a dehumidifying and cooling mode to let the refrigerant discharged from the compressor radiate heat in the radiator and the outdoor heat exchanger, decompress the refrigerant from which the heat has been radiated, and let the refrigerant absorb heat in the heat absorber, and a cooling mode to let the refrigerant discharged from the compressor radiate heat in the outdoor heat exchanger, decompress the refrigerant from which the heat has been radiated, and let the refrigerant absorb heat in the heat absorber, and the air conditioner for the vehicle further includes an opening/closing valve for heating which is connected to an outlet side of the outdoor heat exchanger and is opened in the dehumidifying and heating mode, and an opening/closing valve for dehumidifying which is connected in parallel with the outdoor heat exchanger and is opened in the dehumidifying and heating mode. When the control means changes the operation mode from the cooling mode and/or the dehumidifying and cooling mode to the dehumidifying and heating mode, the control means executes noise improvement control to reduce a difference between a pressure before each opening/closing valve and a pressure after the valve and then to open the opening/closing valve. Consequently, it is possible to noticeably inhibit or eliminate rapid flowing of the refrigerant toward a suction side of the compressor, when the control means opens the opening/closing valve for the heating, to change the operation mode from the cooling mode or the dehumidifying and cooling mode to the dehumidifying and heating mode.

Furthermore, it is similarly possible to inhibit or eliminate rapid flowing of the refrigerant toward a heat absorber side, when the control means opens the opening/closing valve for the dehumidifying, and hence it is possible to eliminate or reduce a noise generated in opening the opening/closing valve for the heating and the opening/closing valve for the dehumidifying, when the operation mode changes from the cooling mode or the dehumidifying and cooling mode to the dehumidifying and heating mode.

According to the invention of claim 2, an air conditioner for a vehicle includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant radiate heat or absorb heat, and a control means, so that this control means changes and executes at least operation modes of an internal cycle mode to let the refrigerant discharged from the compressor radiate heat in the radiator, decompress the refrigerant from which the heat has been radiated, and let the refrigerant absorb heat in the heat absorber, a dehumidifying and cooling mode to let the refrigerant discharged from the compressor radiate heat in the radiator and the outdoor heat exchanger, decompress the refrigerant from which the heat has been radiated, and let the refrigerant absorb heat in the heat absorber, and a cooling mode to let the refrigerant discharged from the compressor radiate heat in the outdoor heat exchanger, decompress the refrigerant from which the heat has been radiated, and let the refrigerant absorb heat in the heat absorber, and the air conditioner for the vehicle further includes an opening/closing valve for dehumidifying which is connected in parallel with the outdoor heat exchanger and is opened in the internal cycle mode. When the control means changes the operation mode from the cooling mode and/or the dehumidifying and cooling mode to the internal cycle mode, the control means executes noise improvement control to reduce a difference between a pressure before the opening/closing valve and a pressure after the valve and then to open the opening/closing valve. Consequently, it is possible to noticeably inhibit or eliminate rapid flowing of the refrigerant toward a heat absorber side, when the control means opens the opening/closing valve for the dehumidifying, to change the operation mode from the cooling mode or the dehumidifying and cooling mode to the internal cycle mode.

In consequence, it is possible to eliminate or reduce a noise generated in opening the opening/closing valve for the dehumidifying, when the operation mode changes from the cooling mode or the dehumidifying and cooling mode to the internal cycle mode.

According to the invention of claim 3, an air conditioner for a vehicle includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant radiate heat or absorb heat, and a control means, so that this control means changes and executes at least operation modes of a heating mode to let the refrigerant discharged from the compressor radiate heat in the radiator, decompress the refrigerant from which the heat has been radiated, and let the refrigerant absorb heat in the outdoor heat exchanger, a dehumidifying and cooling mode to let the refrigerant discharged from the compressor radiate heat in the radiator and the outdoor heat exchanger, decompress the refrigerant from which the heat has been radiated, and let the refrigerant absorb heat in the heat absorber, and a cooling mode to let the refrigerant discharged from the compressor radiate heat in the outdoor heat exchanger, decompress the refrigerant from which the heat has been radiated, and let the refrigerant absorb heat in the heat absorber, and the air conditioner for the vehicle further includes an opening/closing valve for heating which is connected to an outlet side of the outdoor heat exchanger and is opened in the heating mode. When the control means changes the operation mode from the cooling mode and/or the dehumidifying and cooling mode to the heating mode, the control means executes noise improvement control to reduce a difference between a pressure before the opening/closing valve and a pressure after the valve and then to open the opening/closing valve. Consequently, it is possible to noticeably inhibit or eliminate rapid flowing of the refrigerant toward a suction side of the compressor, when the control means opens the opening/closing valve for the heating, to change the operation mode from the cooling mode or the dehumidifying and cooling mode to the heating mode.

In consequence, it is possible to eliminate or reduce a noise generated in opening the opening/closing valve for the heating, when the operation mode changes from the cooling mode or the dehumidifying and cooling mode to the heating mode.

According to the invention of claim 4, an air conditioner for a vehicle includes a compressor to compress a refrigerant, an air flow passage through which air to be supplied to a vehicle interior flows, a radiator to let the refrigerant radiate heat, thereby heating the air to be supplied from the air flow passage to the vehicle interior, a heat absorber to let the refrigerant absorb heat, thereby cooling the air to be supplied from the air flow passage to the vehicle interior, an outdoor heat exchanger disposed outside the vehicle interior to let the refrigerant radiate heat or absorb heat, and a control means, so that this control means changes and executes at least operation modes of a heating mode to let the refrigerant discharged from the compressor radiate heat in the radiator, decompress the refrigerant from which the heat has been radiated, and let the refrigerant absorb heat in the outdoor heat exchanger, a dehumidifying and heating mode to let the refrigerant discharged from the compressor radiate heat in the radiator, decompress the refrigerant from which the heat has been radiated, and let the refrigerant absorb heat in the heat absorber and the outdoor heat exchanger, and an internal cycle mode to let the refrigerant discharged from the compressor radiate heat in the radiator, decompress the refrigerant from which the heat has been radiated, and let the refrigerant absorb heat in the heat absorber, and the air conditioner for the vehicle further includes an opening/closing valve for heating which is connected to an outlet side of the outdoor heat exchanger and is opened in the heating mode and the dehumidifying and heating mode. When the control means changes the operation mode from the internal cycle mode to the heating mode and/or the dehumidifying and heating mode, the control means executes noise improvement control to reduce a difference between a pressure before the opening/closing valve and a pressure after the valve and then to open the opening/closing valve. Consequently, it is possible to noticeably inhibit or eliminate rapid flowing of the refrigerant toward a suction side of the compressor, when the control means opens the opening/closing valve for the heating, to change the operation mode from the internal cycle mode to the heating mode or the dehumidifying and heating mode.

In consequence, it is possible to eliminate or reduce a noise generated in opening the opening/closing valve for the heating, when the operation mode changes from the internal cycle mode to the heating mode or the dehumidifying and heating mode.

In this case, when the control means decreases a number of revolution of the compressor in the noise improvement control as in the invention of claim 5, a pressure on a refrigerant upstream side of the opening/closing valve for the dehumidifying or the opening/closing valve for the heating lowers in the noise improvement control, and hence it is possible to effectively reduce the difference between the pressure before the opening/closing valve and the pressure after the valve.

Furthermore, when the control means stops the compressor in the noise improvement control as in the invention of claim 6, a pressure on a refrigerant upstream side of the opening/closing valve for the dehumidifying or the opening/closing valve for the heating further rapidly lowers in the noise improvement control, and hence it is possible to further effectively reduce the difference between the pressure before each opening/closing valve and the pressure after the valve.

In this case, after elapse of a predetermined time from when the compressor is stopped, the control means opens the opening/closing valve as in the invention of claim 7. Consequently, it is possible to sufficiently achieve the reduction of the difference between the pressure before the opening/closing valve and the pressure after the valve while simplifying the control, and it is possible to effectively eliminate or reduce a noise.

Thus, the control means decreases a number of revolution of the compressor or stops the compressor, reduces the difference between the pressure before the opening/closing valve and the pressure after the valve to a predetermined value or less, and then opens the opening/closing valve as in the invention of claim 8. Consequently, it is possible to further securely eliminate or inhibit generation of a noise due to the difference between the pressure before the opening/closing valve and the pressure after the valve.

In this case, a noise generated in opening the opening/closing valve is hardly a concern in a situation where a velocity is high. Therefore, as in the invention of claim 9, the control means increases a predetermined value of the difference between the pressure before the opening/closing valve and the pressure after the valve, as a velocity is higher. Consequently, in the situation where the noise generated in opening the opening/closing valve is hardly the concern, the predetermined value of the difference between the pressure before the opening/closing valve and the pressure after the valve is heightened, to open the opening/closing valve in an early stage, and hence it is possible to immediately change the operation mode.

Furthermore, the noise generated in opening the opening/closing valve is hardly the concern also in a situation where a volume of the air of an indoor blower which is to be supplied to the air flow passage is large. Also in this case, as in the invention of claim 10, the control means increases a predetermined value of the difference between the pressure before the opening/closing valve and the pressure after the valve, as the volume of the air of the indoor blower is larger. Consequently, the control means opens the opening/closing valve in the early stage, and hence it is similarly possible to immediately change the operation mode.

Additionally, as in the invention of claim 11, when the control means changes the operation mode, the control means increases a volume of the air of the indoor blower or an outdoor blower to pass outdoor air to the outdoor heat exchanger, and also in this case, it is possible to achieve a situation where the noise generated in opening the opening/closing valve is hardly a concern.

Then, as in the invention of claim 12, the control means does not execute the noise improvement control when the velocity has a predetermined value or more and/or when the volume of the air of the indoor blower has a predetermined value or more. Consequently, in the situation where the noise generated in opening the opening/closing valve is hardly the concern, the control means does not execute the noise improvement control and immediately opens the opening/closing valve, and both of discomfort due to the noise and delay in changing the operation mode are avoidable.

BRIEF DESCRIPTION OF THE DRAWINGS

FIG. 3 is a diagram to explain states of an outdoor expansion valve, respective solenoid valves and an evaporation capability control valve, and a difference between a pressure before each valve and a pressure after the valve in the air conditioner for the vehicle of FIG. 1 when changing from a cooling (dehumidifying and cooling) mode to a dehumidifying and heating mode;

FIG. 5 is a diagram to explain states of the outdoor expansion valve, the respective solenoid valves and the evaporation capability control valve, and a difference between a pressure before each valve and a pressure after the valve in the air conditioner for the vehicle of FIG. 1 when changing from the cooling (dehumidifying and cooling) mode to an internal cycle mode;

FIG. 6 is a timing chart of each device which is to explain noise improvement control (No. 2) to be executed by the controller of FIG. 2 when changing from the cooling (dehumidifying and cooling) mode to the internal cycle mode;

FIG. 7 is a diagram to explain states of the outdoor expansion valve, the respective solenoid valves and the evaporation capability control valve, and a difference between a pressure before each valve and a pressure after the valve in the air conditioner for the vehicle of FIG. 1 when changing from the cooling (dehumidifying and cooling) mode to a heating mode;

FIG. 9 is a diagram to explain states of the outdoor expansion valve, the respective solenoid valves and the evaporation capability control valve, and a difference between a pressure before each valve and a pressure after the valve in the air conditioner for the vehicle of FIG. 1 when changing from the internal cycle mode to the dehumidifying and heating mode;

FIG. 11 is a diagram to explain states of the outdoor expansion valve, the respective solenoid valves and the evaporation capability control valve, and a difference between a pressure before each valve and a pressure after the valve in the air conditioner for the vehicle of FIG. 1 when changing from the internal cycle mode to the heating mode;

MODE FOR CARRYING OUT THE INVENTION

Hereinafter, description will be made as to embodiments of the present invention in detail with reference to the drawings.

Embodiment 1

Figure 1:
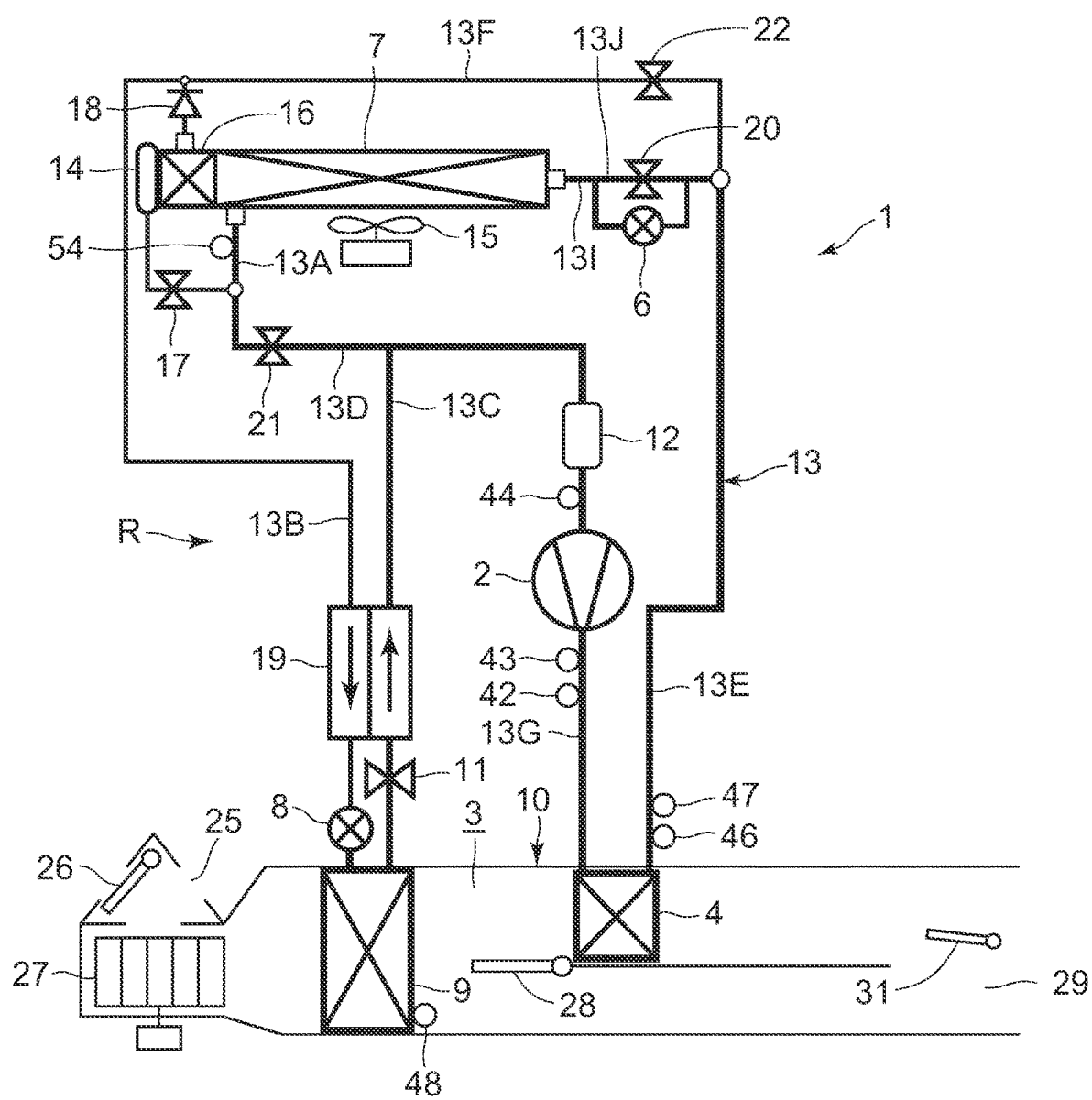
FIG. 1 is a constitutional view of an air conditioner for a vehicle of one embodiment to which the present invention is applied (Embodiment 1)

FIG. 1 shows a constitutional view of an air conditioner for a vehicle 1 of one embodiment of the present invention. The vehicle of the embodiment to which the present invention is applied is an electric vehicle (EV) in which an engine (an internal combustion engine) is not mounted, and runs with an electric motor for running which is driven by power charged in a battery (which is not shown in the drawing), and the air conditioner for the vehicle 1 of the present invention is also driven by the power of the battery. Specifically, in the electric vehicle which is not capable of performing heating by engine waste heat, the air conditioner for the vehicle 1 of the embodiment performs heating by a heat pump operation in which a refrigerant circuit is used, and furthermore, the conditioner selectively executes respective operation modes of dehumidifying and heating, an internal cycle, cooling and dehumidifying, and cooling.

It is to be noted that the vehicle is not limited to the electric vehicle, and the present invention is also effective for a so-called hybrid car in which the engine is used together with the electric motor for running. Furthermore, needless to say, the present invention is also applicable to a usual car which runs with the engine.

The air conditioner for the vehicle 1 of the embodiment performs air conditioning (heating, cooling, dehumidifying, and ventilation) of a vehicle interior of the electric vehicle, and there are successively connected, by a refrigerant pipe 13, an electric type of compressor 2 to compress a refrigerant, a radiator 4 disposed in an air flow passage 3 of an HVAC unit 10 in which vehicle interior air passes and circulates, to let the high-temperature high-pressure refrigerant discharged from the compressor 2 and flowing inside via a refrigerant pipe 13G radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve (which may be a mechanical expansion valve) to decompress and expand the refrigerant, a heat absorber 9 disposed in the air flow passage 3 to let the refrigerant absorb heat from interior and exterior of the vehicle during the cooling and during the dehumidifying, an evaporation capability control valve 11 to control an evaporation capability in the heat absorber 9, an accumulator 12, and others, thereby constituting a refrigerant circuit R.

It is to be noted that an outdoor blower 15 is provided in the outdoor heat exchanger 7. The outdoor blower 15 forcibly passes the outdoor air through the outdoor heat exchanger 7 to perform the heat exchange between the outdoor air and the refrigerant, whereby the outdoor air passes through the outdoor heat exchanger 7 also during stopping of the vehicle (i.e., a velocity VSP is 0 km/h).

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve (for cooling) 17 as an opening/closing valve for the cooling which is to be opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11.

Additionally, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve (for heating) 21 as an opening/closing valve for the heating which is to be opened during the heating. In addition, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve (for dehumidifying) 22 as an opening/closing valve for the dehumidifying which is to be opened during the dehumidifying. That is, the solenoid valve 22 is connected in parallel with the outdoor heat exchanger 7.

Furthermore, the outdoor expansion valve 6 is connected in parallel with a bypass pipe 13J, and in the bypass pipe 13J, a solenoid valve (for bypass) 20 as an opening/closing valve for the bypass is interposed to open in a cooling mode so that the refrigerant bypasses the outdoor expansion valve 6 to flow. It is to be noted that a pipe between the outdoor expansion valve 6 and the solenoid valve 20, and the outdoor heat exchanger 7 is denoted with 131.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air of the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in the air flow passage 3 on the air upstream side of the radiator 4, an air mix damper 28 is disposed to adjust a degree at which the indoor air or outdoor air flows through the radiator 4. Further in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
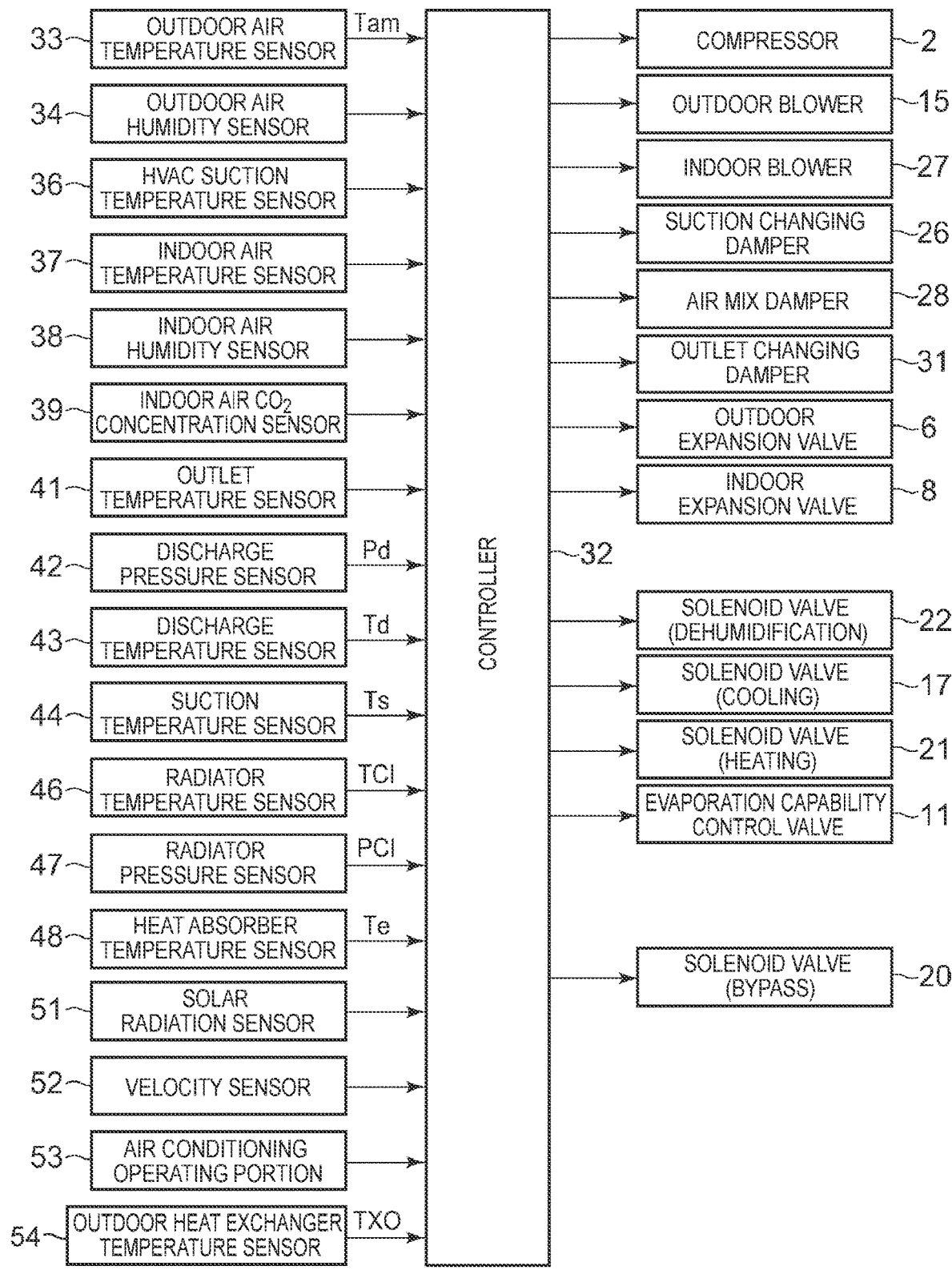
FIG. 2 is a block diagram of an electric circuit of a controller of the air conditioner for the vehicle of FIG. 1.

Next, in FIG. 2, 32 is a controller (ECU) as a control means constituted of a microcomputer, and in the embodiment, an input of the controller 32 is connected to respective outputs of an outdoor air temperature sensor 33 which detects an outdoor air temperature Tam of the vehicle, an outdoor air humidity sensor 34 which detects an outdoor air humidity of the vehicle, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the outlet 29 to the vehicle interior, a discharge pressure sensor 42 which detects a pressure (discharge pressure) Pd of the refrigerant discharged from the compressor 2, a discharge temperature sensor 43 which detects a temperature (discharge temperature) Td of the refrigerant discharged from the compressor 2, a suction temperature sensor 44 which detects a temperature (suction temperature) Ts of the refrigerant to be sucked into the compressor 2, a radiator temperature sensor 46 which detects a refrigerant temperature (radiator temperature) TCI of the radiator 4, a radiator pressure sensor 47 which detects a refrigerant pressure (radiator pressure) PCI of the radiator 4, a heat absorber temperature sensor 48 which detects a temperature (heat absorber temperature) Te of the heat absorber 9, a solar radiation sensor 51 of, e.g., a photo sensor system to detect a solar radiation amount into the vehicle, a velocity sensor 52 to detect a moving speed (the velocity VSP) of the vehicle, an air conditioning operating portion 53 to set the changing of a predetermined temperature or the operation mode, and an outdoor heat exchanger temperature sensor 54 which detects a refrigerant temperature (outdoor heat exchanger temperature) TXO of the outdoor heat exchanger 7.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, and the evaporation capability control valve 11. Then, the controller 32 controls these components on the basis of the outputs of the respective sensors and the setting input by the air conditioning operating portion 53.

Here, the solenoid valve 17 for the cooling and the solenoid valve 20 for the bypass mentioned above are so-called normally open solenoid valves which open during non-energization. Furthermore, the solenoid valve 21 for the heating and the solenoid valve 22 for the dehumidifying mentioned above are so-called normally closed solenoid valves which close during the non-energization, and consequently, even in a state where a power source is disconnected, an annular refrigerant circuit is constituted to communicate with a discharge side of the compressor 2, the radiator 4, the outdoor heat exchanger 7, the heat absorber 9, and a suction side of the compressor 2.

Next, description will be made as to an operation of the air conditioner for the vehicle 1 of the embodiment having the above constitution. In the embodiment, the controller 32 changes and executes respective roughly divided operation modes of a heating mode, a dehumidifying and heating mode, an internal cycle mode, a dehumidifying and cooling mode, and the cooling mode. Description will initially be made as to a flow of the refrigerant in each operation mode.

(1) Heating Mode

When the heating mode is selected by the controller 32 or a manual operation to the air conditioning operating portion 53, the controller 32 opens the solenoid valve 21 for the heating and closes the solenoid valve 17 for the cooling, the solenoid valve 22 for the dehumidifying and the solenoid valve 20 for the bypass. Then, the controller operates the compressor 2 and the respective blowers 15 and 27, and the air mix damper 28 has a state of passing the air blown out from the indoor blower 27 through the radiator 4. In consequence, a high-temperature high-pressure gas refrigerant discharged from the compressor 2 flows into the radiator 4. The air in the air flow passage 3 passes through the radiator 4, and hence the air in the air flow passage 3 heats by the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then flows through the refrigerant pipe 13E to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15. In other words, the refrigerant circuit R functions as a heat pump and the outdoor heat exchanger 7 functions as the evaporator of the refrigerant. Then, the low-temperature refrigerant flowing out from the outdoor heat exchanger 7 flows through the refrigerant pipe 13A, the solenoid valve 21 and the refrigerant pipe 13D, and flows from the refrigerant pipe 13C into the accumulator 12 to perform gas-liquid separation, and the gas refrigerant is sucked into the compressor 2, thereby repeating this circulation. The air heated in the radiator 4 is blown out from the outlet 29, thereby performing the heating of the vehicle interior.

The controller 32 controls a number of revolution Nc of the compressor 2 on the basis of a high pressure-side pressure of the refrigerant circuit R which is converted from the discharge temperature Td detected by the discharge temperature sensor 43 or a high pressure-side pressure (the discharge pressure Pd) of the refrigerant circuit R which is detected by the discharge pressure sensor 42 or a high pressure-side pressure (the radiator pressure PCI) of the refrigerant circuit R which is detected by the radiator pressure sensor 47, and the controller controls a valve position of the outdoor expansion valve 6 on the basis of the temperature of the radiator 4 which is detected by the radiator temperature sensor 46 and the refrigerant pressure of the radiator 4 which is detected by the radiator pressure sensor 47, and controls a subcool degree of the refrigerant in an outlet of the radiator 4.

(2) Dehumidifying and Heating Mode

Next, in the dehumidifying and heating mode, the controller 32 opens the solenoid valve 22 for the dehumidifying in the above state of the heating mode. In consequence, a part of the condensed refrigerant flowing through the radiator 4 and the refrigerant pipe 13E is distributed, and flows through the solenoid valve 22 to flow from the refrigerant pipe 13F and the refrigerant pipe 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior. The controller 32 controls the number of revolution Nc of the compressor 2 on the basis of the high pressure-side pressure of the refrigerant circuit R which is converted from the discharge temperature Td detected by the discharge temperature sensor 43 or the high pressure-side pressure (the discharge pressure Pd) of the refrigerant circuit R which is detected by the discharge pressure sensor 42 or the high pressure-side pressure (the radiator pressure PCI) of the refrigerant circuit R which is detected by the radiator pressure sensor 47, and the controller controls the valve position of the outdoor expansion valve 6 on the basis of the heat absorber temperature Te of the heat absorber 9 which is detected by the heat absorber temperature sensor 48.

(3) Internal Cycle Mode

Next, in the internal cycle mode, the controller 32 fully closes the outdoor expansion valve 6 in the above state of the dehumidifying and heating mode (a fully closed position), and also closes the solenoid valve 20 for the bypass and the solenoid valve 21 for the heating. The outdoor expansion valve 6 and the solenoid valves 20 and 21 are closed, thereby obstructing inflow of the refrigerant into the outdoor heat exchanger 7 and outflow of the refrigerant from the outdoor heat exchanger 7, and hence all the condensed refrigerant flowing through the radiator 4 and the refrigerant pipe 13E flows through the solenoid valve 22 for the bypass to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but the heating capability for a consumed power of the compressor 2 is exerted. Furthermore, the whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number of revolution Nc of the compressor 2 on the basis of the heat absorber temperature Te of the heat absorber 9 or the above-mentioned high pressure-side pressure of the refrigerant circuit R. At this time, the controller 32 selects a smaller compressor target number of revolution from compressor target numbers of revolution obtainable by calculations from the heat absorber temperature Te of the heat absorber 9 and the high pressure-side pressure, to control the compressor 2.

(4) Dehumidifying and Cooling Mode

Next, in the dehumidifying and cooling mode, the controller 32 opens the solenoid valve 17 for the cooling and closes the solenoid valve 21 for the heating, the solenoid valve 22 for the dehumidifying and the solenoid valve 20 for the bypass. Then, the controller operates the compressor 2 and the respective blowers 15 and 27, and the air mix damper 28 has the state of passing the air blown out from the indoor blower 27 through the radiator 4. In consequence, the high-temperature high-pressure gas refrigerant discharged from the compressor 2 flows into the radiator 4. Through the radiator 4, the air in the air flow passage 3 passes, and hence the air in the air flow passage 3 heats by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior. The controller 32 controls the number of revolution Nc of the compressor 2 on the basis of the heat absorber temperature Te of the heat absorber 9 which is detected by the heat absorber temperature sensor 48, also controls the valve position of the outdoor expansion valve 6 on the basis of the above-mentioned high pressure-side pressure of the refrigerant circuit R, and controls the radiator pressure PCI of the radiator 4.

(5) Cooling Mode

Next, in the cooling mode, the controller 32 opens the solenoid valve 20 in the above state of the dehumidifying and cooling mode (in this case, the outdoor expansion valve 6 may have any valve position including a fully opened position (the valve position is an upper limit of controlling)), and the air mix damper 28 has a state of controlling a volume of the air to be passed which includes a state where the air does not pass through the radiator 4. In consequence, the high-temperature high-pressure gas refrigerant discharged from the compressor 2 flows into the radiator 4. When the air in the air flow passage 3 does not pass through the radiator 4, the refrigerant only passes the radiator, and when the air passes through the radiator, the controller lets the refrigerant radiate heat in the air. The refrigerant flowing out from the radiator 4 flows through the refrigerant pipe 13E to reach the solenoid valve 20 and the outdoor expansion valve 6.

At this time, the solenoid valve 20 opens, and hence the refrigerant bypasses the outdoor expansion valve 6 to pass the bypass pipe 13J, and flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 or slightly passes the radiator, and is blown out from the outlet 29 to the vehicle interior, thereby performing the cooling of the vehicle interior. In this cooling mode, the controller 32 controls the number of revolution Nc of the compressor 2 on the basis of the heat absorber temperature Te of the heat absorber 9 which is detected by the heat absorber temperature sensor 48.

On startup, the controller 32 selects the operation mode on the basis of the outdoor air temperature Tam detected by the outdoor air temperature sensor 33 and a target outlet temperature TAO. Furthermore, after the startup, the controller selects and changes the above respective operation modes in accordance with changes of environments and predetermined conditions of the outdoor air temperature Tam, the target outlet temperature TAO and the like.

(6) Noise Improvement Control (No. 1)

Next, description will be made as to one example of noise improvement control to be executed by the controller 32 when the operation mode of the air conditioner for the vehicle 1 changes from the above-mentioned cooling mode or dehumidifying and cooling mode (preferably from one or both of these modes) to the dehumidifying and heating mode, with reference to FIG. 3 and FIG. 4. FIG. 3 shows respective opened/closed states of the outdoor expansion valve 6, the solenoid valve 20 for the bypass, the solenoid valve 21 for the heating, the solenoid valve 17 for the cooling, the solenoid valve 22 for the dehumidifying and the evaporation capability control valve 11 in the cooling (dehumidifying and cooling) mode and the dehumidifying and heating mode, and a difference between a pressure before each valve and a pressure after the valve (a difference between a pressure on a refrigerant upstream side of each valve and a pressure on a refrigerant downstream side of the valve) when changing from the cooling (dehumidifying and cooling) mode to the dehumidifying and heating mode. It is to be noted that an opened (closed) state shown in a row of the solenoid valve 20 in a column of the cooling (the dehumidifying and cooling) of FIG. 3 means that the solenoid valve is opened in the cooling mode and closed in the dehumidifying and cooling mode (this also applies to FIG. 5 and FIG. 7).

Figure 4:
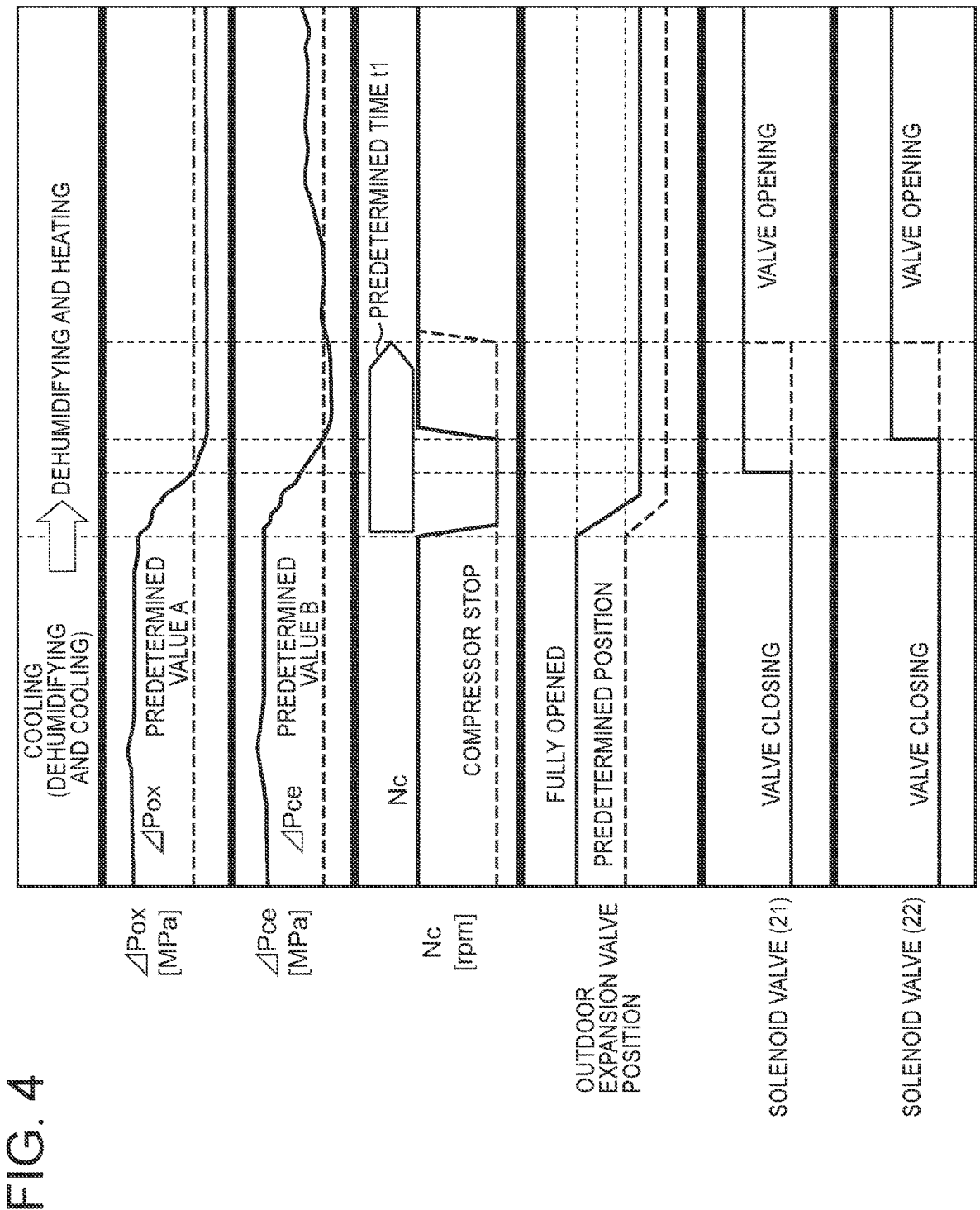
FIG. 4 is a timing chart of each device which is to explain noise improvement control (No. 1) to be executed by the controller of FIG. 2 when changing from the cooling (dehumidifying and cooling) mode to the dehumidifying and heating mode.

Furthermore, a timing chart of FIG. 4 shows a difference ΔPox between a pressure before the solenoid valve 21 for the heating and a pressure after the valve, a difference ΔPce between a pressure before the solenoid valve 22 for the dehumidifying and a pressure after the valve, the number of revolution Nc of the compressor 2, and states of the outdoor expansion valve 6, the solenoid valve 21 and the solenoid valve 22 when changing from the cooling (or dehumidifying and cooling) mode to the dehumidifying and heating mode.

It is to be noted that the difference ΔPox between the pressure before the solenoid valve 21 and the pressure after the valve is a difference (ΔPox=Pox1−Pox2) between a pressure Pox1 on the refrigerant upstream side of (before) the solenoid valve 21 which is converted from the outdoor heat exchanger temperature TXO detected by the outdoor heat exchanger temperature sensor 54 and a pressure Pox2 on the refrigerant downstream side of (after) the solenoid valve 21 which is converted from the heat absorber temperature Te detected by the heat absorber temperature sensor 48, and the controller 32 calculates the difference. Furthermore, the difference ΔPce between the pressure before the solenoid valve 22 and the pressure after the valve is a difference (ΔPce=PCI−Pox1) between the radiator pressure PCI detected by the radiator pressure sensor 47 (the pressure on the refrigerant upstream side of (before) the solenoid valve 22) and the pressure Pox1 on the refrigerant downstream side of (after) the solenoid valve 22 which is converted from the outdoor heat exchanger temperature TXO detected by the outdoor heat exchanger temperature sensor 54, and the controller 32 also calculates this difference (this also applies to the noise improvement control below).

When the operation mode changes from the cooling mode or the dehumidifying and cooling mode to the dehumidifying and heating mode, the difference ΔPox between the pressure before the solenoid valve 21 for the heating and the pressure after the valve changes from a medium difference to a small difference as shown in FIG. 3, and has a comparatively larger value. Furthermore, the difference ΔPce between the pressure before the solenoid valve 22 for the dehumidifying and the pressure after the valve also changes from a medium difference to a small difference, and has a comparatively larger value. Therefore, when the respective solenoid valves 21 and 22 closed in the cooling mode or the dehumidifying and cooling mode are opened to change to the dehumidifying and heating mode while keeping such a pressure difference, the refrigerant rapidly flows from the outdoor heat exchanger 7 through the solenoid valve 21 toward the suction side (an accumulator 12 side) of the compressor 2, and the refrigerant also rapidly flows from the radiator 4 through the solenoid valve 22 toward a heat absorber 9 side (an indoor expansion valve 8 side), thereby generating a loud sound (noise) in the respective solenoid valves 21 and 22.

To eliminate the problem, the controller 32 executes the noise improvement control which will be described below, when changing the operation mode from the cooling mode or the dehumidifying and cooling mode to the dehumidifying and heating mode. Specifically, when the controller 32 changes the operation mode from the cooling mode or the dehumidifying and cooling mode to the dehumidifying and heating mode, the controller initially stops the compressor 2 prior to changing the operation mode in the embodiment. When the compressor 2 stops, a pressure in the refrigerant circuit R changes toward an equilibrium state (the high pressure-side pressure lowers and a low pressure-side pressure rises), and hence the differences ΔPox and ΔPce between the pressures before the solenoid valve 21 and the solenoid valve 22 and the pressures after the valves also decrease.

Then, when the pressure difference ΔPox reduces to a predetermined value A (e.g., 0.1 MPa) or less, the controller 32 opens the solenoid valve 21 for the heating, and when the pressure difference ΔPce reduces to a predetermined value B (e.g., 0.5 MPa) or less, the controller 32 opens the solenoid valve 22 for the dehumidifying. Furthermore, when the controller 32 opens both the solenoid valves 21 and 22 (when the controller opens the solenoid valve 22 in the embodiment), the controller starts the compressor 2, to start an air conditioning operation of the dehumidifying and heating mode.

In this way, when the controller 32 changes the operation mode from the cooling mode or the dehumidifying and cooling mode to the dehumidifying and heating mode, the controller executes the noise improvement control to reduce the differences ΔPox and ΔPce between the pressures before the solenoid valve 21 for the heating and the solenoid valve 22 for the dehumidifying and the pressures after the valves and then to open the respective solenoid valves 21 and 22. Consequently, it is possible to noticeably inhibit or eliminate rapid flowing of the refrigerant toward the suction side of the compressor 2, when the controller opens the solenoid valve 21 for the heating, to change the operation mode from the cooling mode or the dehumidifying and cooling mode to the dehumidifying and heating mode.

Furthermore, it is similarly possible to inhibit or eliminate rapid flowing of the refrigerant toward the heat absorber 9 side, when the controller opens the solenoid valve 22 for the dehumidifying. In consequence, it is possible to eliminate or reduce noises generated in opening the solenoid valve 21 for the heating and the solenoid valve 22 for the dehumidifying, when the operation mode changes from the cooling mode or the dehumidifying and cooling mode to the dehumidifying and heating mode.

Additionally, the controller 32 stops the compressor 2 in the above noise improvement control, and hence the pressure on the refrigerant upstream side of the solenoid valve 22 for the dehumidifying or the solenoid valve 21 for the heating further immediately lowers in the noise improvement control, so that it is possible to further effectively reduce the difference ΔPce or ΔPox between the pressure before each solenoid valve 22 or 21 and the pressure after the valve.

In addition, the controller 32 stops the compressor 2, reduces the difference ΔPox or ΔPce between the pressure before the solenoid valve 21 or 22 and the pressure after the valve to the predetermined value A or B or less, and then opens each solenoid valve 21 or 22. Consequently, it is possible to further securely eliminate or inhibit the generation of the noise due to the difference between the pressure before the solenoid valve 21 or 22 and the pressure after the valve.

It is to be noted that in the above noise improvement control of the embodiment, when the controller 32 reduces the difference ΔPox or ΔPce between the pressure before the solenoid valve 21 for the heating or the solenoid valve 22 for the dehumidifying and the pressure after the valve to the predetermined value A or B or less, the controller opens each solenoid valve 21 or 22, and when the controller reduces both the differences, the controller starts the compressor 2. However, the present invention is not limited to this example. As shown by a broken line in FIG. 4, after elapse of a predetermined time t1 (e.g., 20 seconds or the like) from when the compressor 2 is stopped, the controller may open both the solenoid valves 21 and 22, and start the compressor 2.

According to such control by the time elapsed after the compressor 2 is stopped, the control itself is simplified as compared with the above-mentioned example of the control with the above-mentioned reduction of the pressure difference to the predetermined value A or B. Additionally, depending on circumstances, the time required for the changing of the operation mode occasionally lengthens more than in the above-mentioned direct control with the above-mentioned predetermined values A and B, but when the predetermined time t1 is appropriately set, the controller sufficiently achieves the reduction of the difference ΔPox or ΔPce between the pressure before the solenoid valve 21 or 22 and the pressure after the valve so that it is possible to effectively eliminate or reduce the noise (this also applies to noise reduction control below).

Furthermore, in the above noise improvement control of the embodiment, the controller 32 stops the compressor 2, but the present invention is not limited to this example, and the controller may decrease the number of revolution Nc of the compressor 2. Thus, also when the controller decreases the number of revolution Nc of the compressor 2, the pressure on the refrigerant upstream side of the solenoid valve 22 for the dehumidifying or the solenoid valve 21 for the heating can lower, and hence it is possible to effectively reduce the difference ΔPce or ΔPox between the pressure before each solenoid valve 22 or 21 and the pressure after the valve (this also applies to the noise reduction control below).

(7) Noise Improvement Control (No. 2)

Next, description will be made as to one example of noise improvement control to be executed by the controller 32 when the operation mode of the air conditioner for the vehicle 1 changes from the above-mentioned cooling mode or dehumidifying and cooling mode (preferably from one or both of these modes) to the internal cycle mode, with reference to FIG. 5 and FIG. 6. FIG. 5 shows respective opened/closed states of the outdoor expansion valve 6, the solenoid valve 20 for the bypass, the solenoid valve 21 for the heating, the solenoid valve 17 for the cooling, the solenoid valve 22 for the dehumidifying and the evaporation capability control valve 11 in the cooling (dehumidifying and cooling) mode and the internal cycle mode, and a difference between a pressure before each valve and a pressure after the valve (the difference between the pressure on the refrigerant upstream side of each valve and the pressure on the refrigerant downstream side of the valve) when changing from the cooling (dehumidifying and cooling) mode to the internal cycle mode.

Furthermore, a timing chart of FIG. 6 shows the difference ΔPox between the pressure before the solenoid valve 21 for the heating and the pressure after the valve, the difference ΔPce between the pressure before the solenoid valve 22 for the dehumidifying and the pressure after the valve, the number of revolution Nc of the compressor 2, and the states of the outdoor expansion valve 6, the solenoid valve 21 and the solenoid valve 22, when the operation mode changes from the cooling (or dehumidifying and cooling) mode to the internal cycle mode. It is to be noted that the solenoid valve 21 is closed in both the cooling (or dehumidifying and cooling) mode and the internal cycle mode, and hence in this case, the difference ΔPox between the pressure before the solenoid valve 21 and the pressure after the valve is not taken into consideration.

When the operation mode changes from the cooling mode or the dehumidifying and cooling mode to the internal cycle mode, the difference ΔPce between the pressure before the solenoid valve 22 for the dehumidifying and the pressure after the valve changes from a medium difference to a small difference, and has a comparatively larger value. Therefore, when the valve 22 closed in the cooling mode or the dehumidifying and cooling mode is opened to change to the internal cycle mode while keeping such a pressure difference, the refrigerant rapidly flows from the radiator 4 through the solenoid valve 22 toward the heat absorber 9 side (the indoor expansion valve 8 side), thereby generating the loud sound (noise) in the solenoid valve 22.

To eliminate the problem, the controller 32 also executes the noise improvement control which will be described below, when changing the operation mode from the cooling mode or the dehumidifying and cooling mode to the internal cycle mode. Specifically, when the controller 32 changes the operation mode from the cooling mode or the dehumidifying and cooling mode to the internal cycle mode, the controller also initially stops the compressor 2 prior to changing the operation mode in this case. When the compressor 2 stops, the pressure in the refrigerant circuit R changes toward the equilibrium state, and hence the difference ΔPce between the pressure before the solenoid valve 22 and the pressure after the valve also decreases.

Then, when the pressure difference ΔPce reduces to the above-mentioned predetermined value B or less, the controller 32 opens the solenoid valve 22 for the dehumidifying. Furthermore, when the solenoid valve 22 opens, the controller 32 starts the compressor 2, to start an air conditioning operation of the internal cycle mode.

In this way, when the controller 32 changes the operation mode from the cooling mode or the dehumidifying and cooling mode to the internal cycle mode, the controller executes the noise improvement control to reduce the difference ΔPce between the pressure before the solenoid valve 22 for the dehumidifying and the pressure after the valve and then to open the solenoid valve 22. Consequently, it is possible to inhibit or eliminate the rapid flowing of the refrigerant toward the heat absorber 9 side, when the controller opens the solenoid valve 22 for the dehumidifying, to change the operation mode from the cooling mode or the dehumidifying and cooling mode to the internal cycle mode.

In consequence, it is possible to eliminate or reduce the noise generated in opening the solenoid valve 22 for the dehumidifying, when the operation mode changes from the cooling mode or the dehumidifying and cooling mode to the internal cycle mode.

Furthermore, also in the noise improvement control of this case, the controller 32 stops the compressor 2, and hence the pressure on the refrigerant upstream side of the solenoid valve 22 for the dehumidifying further immediately lowers, so that it is possible to further effectively reduce the difference ΔPce between the pressure before the solenoid valve 22 and the pressure after the valve.

In addition, the controller 32 stops the compressor 2, reduces the difference ΔPce between the pressure before the solenoid valve 22 and the pressure after the valve to the predetermined value B or less, and then opens the solenoid valve 22. Consequently, it is possible to further securely eliminate or inhibit the generation of the noise due to the difference between the pressure before the solenoid valve 22 and the pressure after the valve.

It is to be noted that in the above noise improvement control of the embodiment, when the controller 32 reduces the difference ΔPce between the pressure before the solenoid valve 22 for the dehumidifying and the pressure after the valve to the predetermined value B or less, the controller opens the solenoid valve 22 and starts the compressor 2. However, also in this case, as shown by a broken line in FIG. 6, after the elapse of the above-mentioned predetermined time t1 from when the compressor 2 is stopped, the controller may open the solenoid valve 22, and start the compressor 2. Furthermore, the controller 32 may similarly decrease the number of revolution Nc of the compressor 2 also in the above noise improvement control of the embodiment.

(8) Noise Improvement Control (No. 3)

Next, description will be made as to one example of the noise improvement control to be executed by the controller 32 when the operation mode of the air conditioner for the vehicle 1 changes from the above-mentioned cooling mode or dehumidifying and cooling mode (preferably from one or both of these modes) to the heating mode, with reference to FIG. 7 and FIG. 8. FIG. 7 shows respective opened/closed states of the outdoor expansion valve 6, the solenoid valve 20 for the bypass, the solenoid valve 21 for the heating, the solenoid valve 17 for the cooling, the solenoid valve 22 for the dehumidifying and the evaporation capability control valve 11 in the cooling (dehumidifying and cooling) mode and the heating mode, and a difference between a pressure before each valve and a pressure after the valve (the difference between the pressure on the refrigerant upstream side of each valve and the pressure on the refrigerant downstream side of the valve) when changing from the cooling (dehumidifying and cooling) mode to the heating mode.

Figure 8:
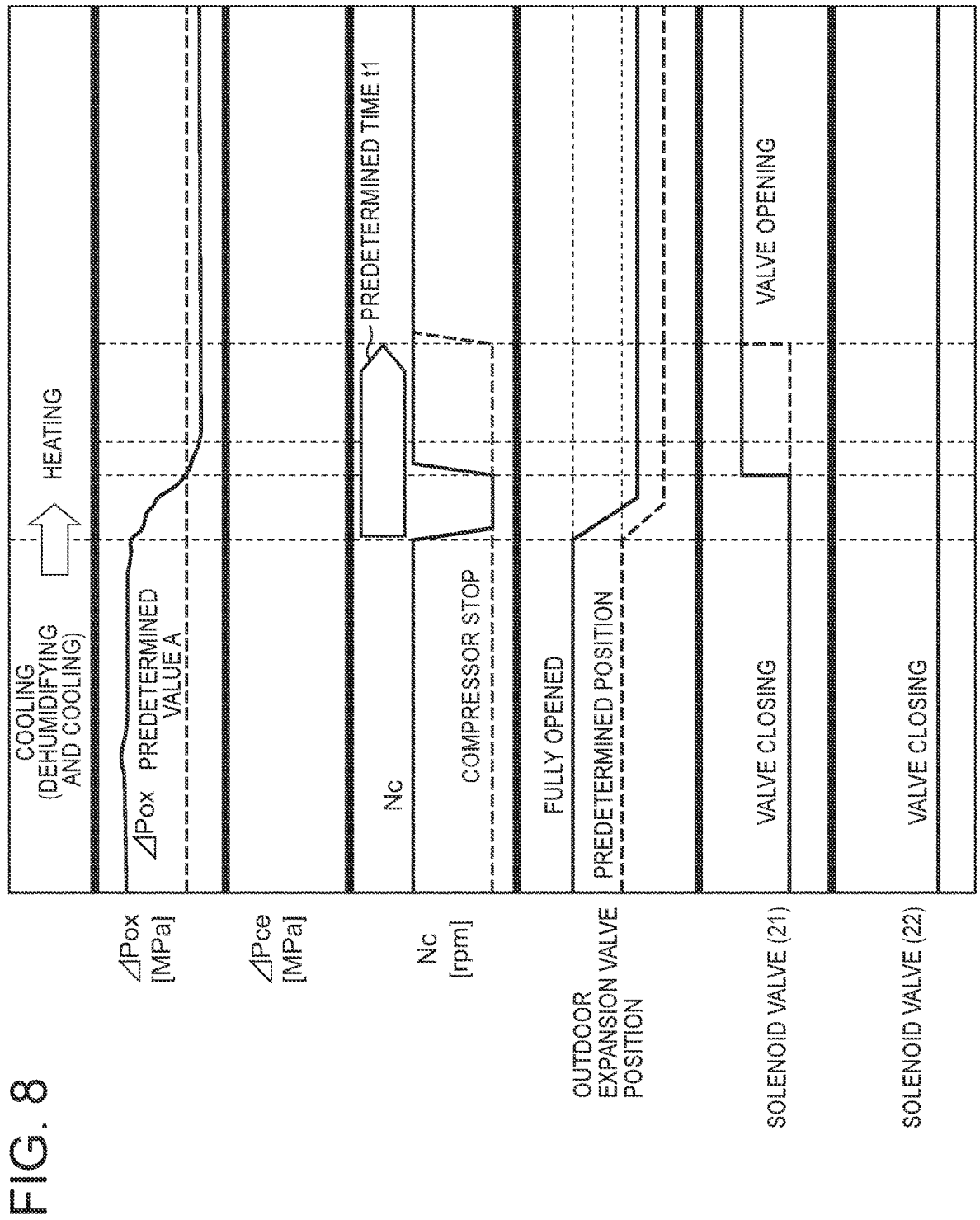
FIG. 8 is a timing chart of each device which is to explain noise improvement control (No. 3) to be executed by the controller of FIG. 2 when changing from the cooling (dehumidifying and cooling) mode to the heating mode.

Furthermore, a timing chart of FIG. 8 shows the difference ΔPox between the pressure before the solenoid valve 21 for the heating and the pressure after the valve, the difference ΔPce between the pressure before the solenoid valve 22 for the dehumidifying and the pressure after the valve, the number of revolution Nc of the compressor 2, and the states of the outdoor expansion valve 6, the solenoid valve 21 and the solenoid valve 22, when the operation mode changes from the cooling (or dehumidifying and cooling) mode to the heating mode. It is to be noted that the solenoid valve 22 is closed in both the cooling (or dehumidifying and cooling) mode and the heating mode, and hence in this case, the difference ΔPce between the pressure before the solenoid valve 22 and the pressure after the valve is not taken into consideration.

When the operation mode changes from the cooling mode or the dehumidifying and cooling mode to the heating mode, the difference ΔPox between the pressure before the solenoid valve 21 for the heating and the pressure after the valve changes from a medium difference to a small difference, and has a comparatively larger value. Therefore, when the valve 21 closed in the cooling mode or the dehumidifying and cooling mode is opened to change to the heating mode while keeping such a pressure difference, the refrigerant rapidly flows from the outdoor heat exchanger 7 through the solenoid valve 21 toward the suction side (the accumulator 12 side) of the compressor 2, thereby generating the loud sound (noise) in the solenoid valve 21.

To eliminate the problem, the controller 32 also executes the noise improvement control which will be described below, when changing the operation mode from the cooling mode or the dehumidifying and cooling mode to the heating mode. Specifically, when the controller 32 changes the operation mode from the cooling mode or the dehumidifying and cooling mode to the heating mode, the controller also initially stops the compressor 2 prior to changing the operation mode in this case. When the compressor 2 stops, the pressure in the refrigerant circuit R changes toward the equilibrium state, and hence the difference ΔPox between the pressure before the solenoid valve 21 and the pressure after the valve also decreases.

Then, when the pressure difference ΔPox reduces to the above-mentioned predetermined value A or less, the controller 32 opens the solenoid valve 21 for the heating. Furthermore, when the solenoid valve 21 opens, the controller 32 starts the compressor 2, to start an air conditioning operation of the heating mode.

In this way, when the controller 32 changes the operation mode from the cooling mode or the dehumidifying and cooling mode to the heating mode, the controller executes the noise improvement control to reduce the difference ΔPox between the pressure before the solenoid valve 21 for the heating and the pressure after the valve and then to open the solenoid valve 21. Consequently, it is possible to inhibit or eliminate the rapid flowing of the refrigerant toward the suction side of the compressor 2 (the accumulator 12 side), when the controller opens the solenoid valve 21 for the heating, to change the operation mode from the cooling mode or the dehumidifying and cooling mode to the heating mode. In consequence, it is possible to eliminate or reduce the noise generated in opening the solenoid valve 21 for the heating, when the operation mode changes from the cooling mode or the dehumidifying and cooling mode to the heating mode.

Furthermore, also in the noise improvement control of this case, the controller 32 stops the compressor 2, and hence the pressure on the refrigerant upstream side of the solenoid valve 21 for the heating further immediately lowers, so that it is possible to further effectively reduce the difference ΔPox between the pressure before the solenoid valve 21 and the pressure after the valve.

In addition, the controller 32 stops the compressor 2, reduces the difference ΔPox between the pressure before the solenoid valve 21 and the pressure after the valve to the predetermined value A or less, and then opens the solenoid valve 21. Consequently, it is possible to further securely eliminate or inhibit the generation of the noise due to the difference between the pressure before the solenoid valve 21 and the pressure after the valve.

It is to be noted that in the above noise improvement control of the embodiment, when the controller 32 reduces the difference ΔPox between the pressure before the solenoid valve 21 for the heating and the pressure after the valve to the predetermined value A or less, the controller opens the solenoid valve 21 and starts the compressor 2. However, also in this case, as shown by a broken line in FIG. 8, after the elapse of the above-mentioned predetermined time t1 from when the compressor 2 is stopped, the controller may open the solenoid valve 21, and start the compressor 2. Furthermore, the controller 32 may similarly decrease the number of revolution Nc of the compressor 2 also in the above noise improvement control of the embodiment.

(9) Noise Improvement Control (No. 4)

Next, description will be made as to one example of noise improvement control to be executed by the controller 32 when the controller changes the operation mode of the air conditioner for the vehicle 1 from the above-mentioned internal cycle mode to the dehumidifying and heating mode, with reference to FIG. 9 and FIG. 10. FIG. 9 shows respective opened/closed states of the outdoor expansion valve 6, the solenoid valve 20 for the bypass, the solenoid valve 21 for the heating, the solenoid valve 17 for the cooling, the solenoid valve 22 for the dehumidifying and the evaporation capability control valve 11 in the internal cycle mode and the dehumidifying and heating mode, and a difference between a pressure before each valve and a pressure after the valve (the difference between the pressure on the refrigerant upstream side of each valve and the pressure on the refrigerant downstream side of the valve) when the operation mode changes from the internal cycle mode to the dehumidifying and heating mode.

Figure 10:
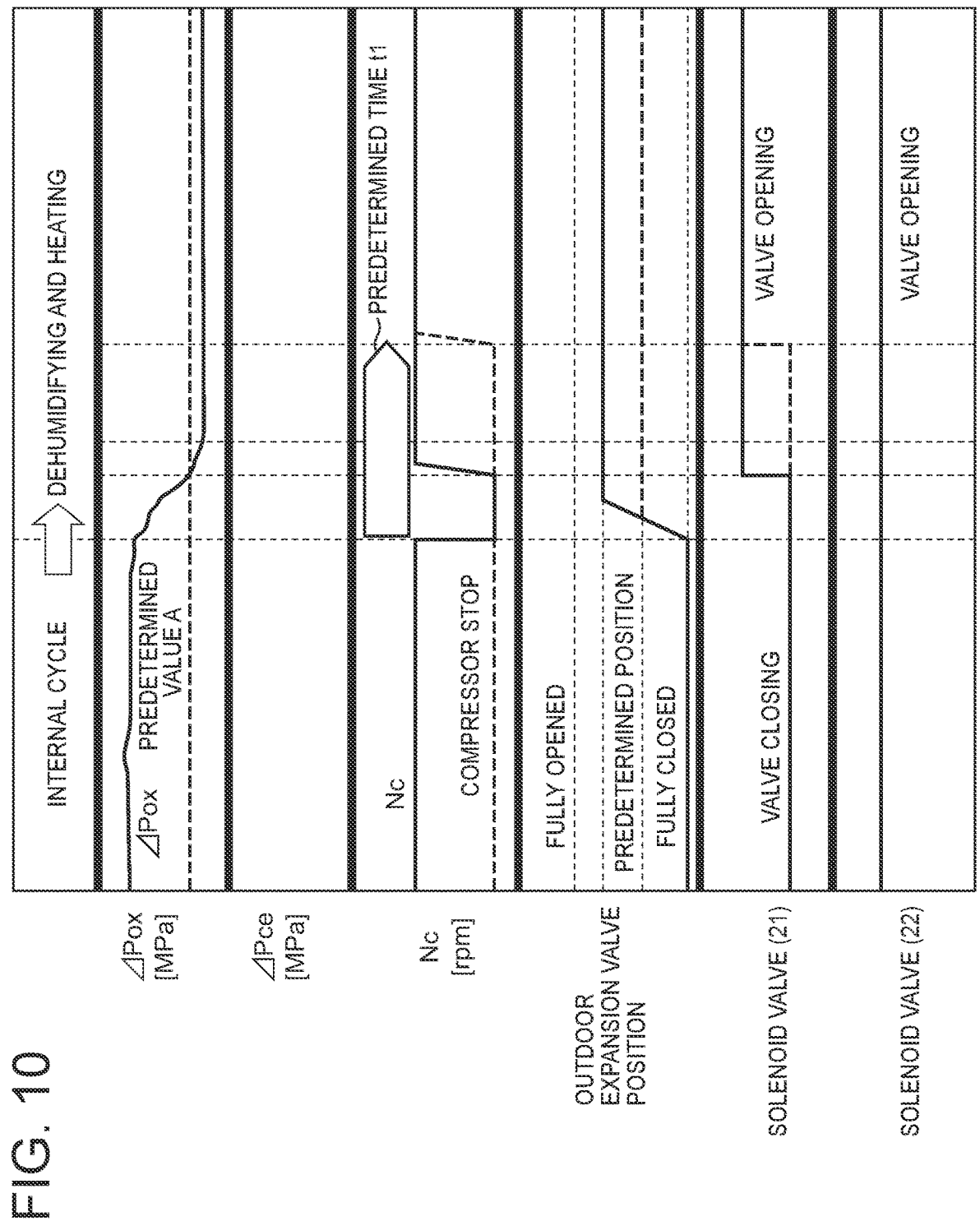
FIG. 10 is a timing chart of each device which is to explain noise improvement control (No. 4) to be executed by the controller of FIG. 2 when changing from the internal cycle mode to the dehumidifying and heating mode.

Furthermore, a timing chart of FIG. 10 shows the difference ΔPox between the pressure before the solenoid valve 21 for the heating and the pressure after the valve, the difference ΔPce between the pressure before the solenoid valve 22 for the dehumidifying and the pressure after the valve, the number of revolution Nc of the compressor 2, and the states of the outdoor expansion valve 6, the solenoid valve 21 and the solenoid valve 22, when the operation mode changes from the internal cycle mode to the dehumidifying and heating mode. It is to be noted that the solenoid valve 22 is opened in both the internal cycle mode and the dehumidifying and heating mode, and hence in this case, the difference ΔPce between the pressure before the solenoid valve 22 and the pressure after the valve is not taken into consideration.

When the operation mode changes from the internal cycle mode to the dehumidifying and heating mode, the difference ΔPox between the pressure before the solenoid valve 21 for the heating and the pressure after the valve changes from a medium difference to a small difference, and has a comparatively larger value. Therefore, when the valve 21 closed in the internal cycle mode is opened to change to the dehumidifying and heating mode while keeping such a pressure difference, the refrigerant rapidly flows from the outdoor heat exchanger 7 through the solenoid valve 21 toward the suction side (the accumulator 12 side) of the compressor 2, thereby generating the loud sound (noise) in the solenoid valve 21.

To eliminate the problem, the controller 32 also executes the noise improvement control which will be described below, when changing the operation mode from the internal cycle mode to the dehumidifying and heating mode. Specifically, when the controller 32 changes the operation mode from the internal cycle mode to the dehumidifying and heating mode, the controller also initially stops the compressor 2 prior to changing the operation mode in this case. When the compressor 2 stops, the pressure in the refrigerant circuit R changes toward the equilibrium state, and hence the difference ΔPox between the pressure before the solenoid valve 21 and the pressure after the valve also decreases.

Then, when the pressure difference ΔPox reduces to the above-mentioned predetermined value A or less, the controller 32 opens the solenoid valve 21 for the heating. Furthermore, when the solenoid valve 21 opens, the controller 32 starts the compressor 2, to start an air conditioning operation of the dehumidifying and heating mode.

In this way, when the controller 32 changes the operation mode from the internal cycle mode to the dehumidifying and heating mode, the controller executes the noise improvement control to reduce the difference ΔPox between the pressure before the solenoid valve 21 for the heating and the pressure after the valve and then to open the solenoid valve 21. Consequently, it is possible to inhibit or eliminate the rapid flowing of the refrigerant toward the suction side (the accumulator 12 side) of the compressor 2, when the controller opens the solenoid valve 21 for the heating, to change the operation mode from the internal cycle mode to the dehumidifying and heating mode. In consequence, it is possible to eliminate or reduce the noise generated in opening the solenoid valve 21 for the heating, when the operation mode changes from the internal cycle mode to the dehumidifying and heating mode.

Furthermore, also in the noise improvement control of this case, the controller 32 stops the compressor 2, and hence the pressure on the refrigerant upstream side of the solenoid valve 21 for the heating further immediately lowers, so that it is possible to further effectively reduce the difference ΔPox between the pressure before the solenoid valve 21 and the pressure after the valve.

Additionally, the controller 32 stops the compressor 2, reduces the difference ΔPox between the pressure before the solenoid valve 21 and the pressure after the valve to the predetermined value A or less, and then opens the solenoid valve 21. Consequently, it is possible to further securely eliminate or inhibit the generation of the noise due to the difference between the pressure before the solenoid valve 21 and the pressure after the valve.

It is to be noted that in the above noise improvement control of the embodiment, when the controller 32 reduces the difference ΔPox between the pressure before the solenoid valve 21 for the heating and the pressure after the valve to the predetermined value A or less, the controller opens the solenoid valve 21 and starts the compressor 2. However, also in this case, as shown by a broken line in FIG. 10, after the elapse of the above-mentioned predetermined time t1 from when the compressor 2 is stopped, the controller may open the solenoid valve 21, and start the compressor 2. Furthermore, the controller 32 may similarly decrease the number of revolution Nc of the compressor 2 also in the above noise improvement control of the embodiment.

(10) Noise Improvement Control (No. 5)

Next, description will be made as to one example of the noise improvement control to be executed by the controller 32 when the controller changes the operation mode of the air conditioner for the vehicle 1 from the above-mentioned internal cycle mode to the heating mode, with reference to FIG. 11 and FIG. 12. FIG. 11 shows respective opened/closed states of the outdoor expansion valve 6, the solenoid valve 20 for the bypass, the solenoid valve 21 for the heating, the solenoid valve 17 for the cooling, the solenoid valve 22 for the dehumidifying and the evaporation capability control valve 11 in the internal cycle mode and the heating mode, and a difference between a pressure before each valve and a pressure after the valve (the difference between the pressure on the refrigerant upstream side of each valve and the pressure on the refrigerant downstream side of the valve) when the operation mode changes from the internal cycle mode to the heating mode.

Figure 12:
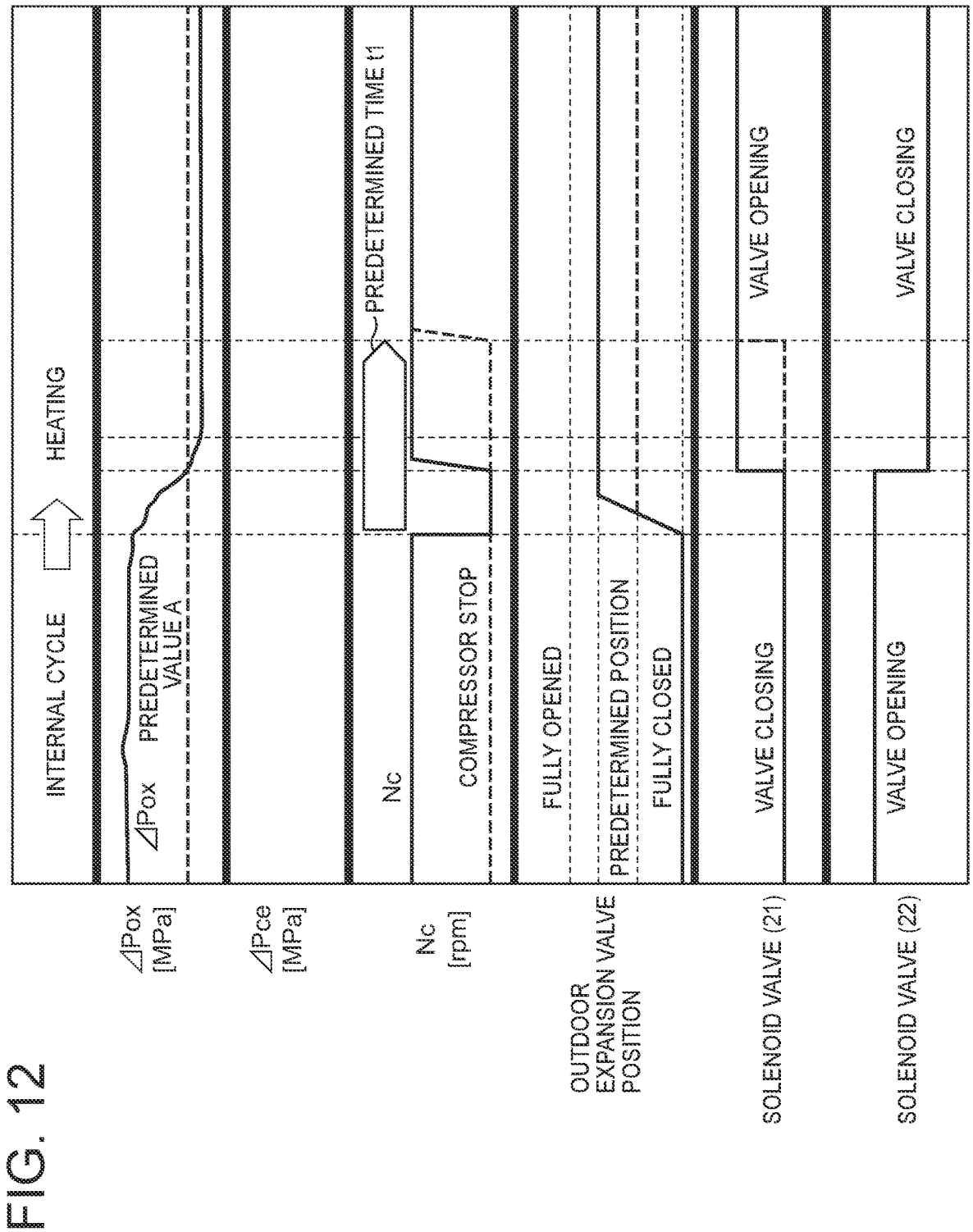
FIG. 12 is a timing chart of each device which is to explain noise improvement control (No. 5) to be executed by the controller of FIG. 2 when changing from the internal cycle mode to the heating mode.

Furthermore, a timing chart of FIG. 12 shows the difference ΔPox between the pressure before the solenoid valve 21 for the heating and the pressure after the valve, the difference ΔPce between the pressure before the solenoid valve 22 for the dehumidifying and the pressure after the valve, the number of revolution Nc of the compressor 2, and the states of the outdoor expansion valve 6, the solenoid valve 21 and the solenoid valve 22, when the operation mode changes from the internal cycle mode to the heating mode. It is to be noted that the solenoid valve 22 is opened in the internal cycle mode and is closed in the heating mode, and hence in this case, the difference ΔPce between the pressure before the solenoid valve 22 and the pressure after the valve is not taken into consideration.

When the operation mode changes from the internal cycle mode to the heating mode, the difference ΔPox between the pressure before the solenoid valve 21 for the heating and the pressure after the valve changes from a medium difference to a small difference, and has a comparatively larger value. Therefore, when the valve 21 closed in the internal cycle mode is opened to change to the heating mode while keeping such a pressure difference, the refrigerant rapidly flows from the outdoor heat exchanger 7 through the solenoid valve 21 toward the suction side (the accumulator 12 side) of the compressor 2, and the loud sound (noise) is generated in the solenoid valve 21.

To eliminate the problem, the controller 32 also executes the noise improvement control which will be described below, when changing the operation mode from the internal cycle mode to the heating mode. Specifically, when the controller 32 changes the operation mode from the internal cycle mode to the heating mode, the controller also initially stops the compressor 2 prior to changing the operation mode in this case. When the compressor 2 stops, the pressure in the refrigerant circuit R changes toward the equilibrium state, and hence the difference ΔPox between the pressure before the solenoid valve 21 and the pressure after the valve also decreases.

Then, when the pressure difference ΔPox reduces to the above-mentioned predetermined value A or less, the controller 32 opens the solenoid valve 21 for the heating. Furthermore, when the solenoid valve 21 opens, the controller 32 starts the compressor 2, to start an air conditioning operation of the heating mode.

In this way, when the controller 32 changes the operation mode from the internal cycle mode to the heating mode, the controller executes the noise improvement control to reduce the difference ΔPox between the pressure before the solenoid valve 21 for the heating and the pressure after the valve and then to open the solenoid valve 21. Consequently, it is possible to inhibit or eliminate the rapid flowing of the refrigerant toward the suction side (the accumulator 12 side) of the compressor 2, when the controller opens the solenoid valve 21 for the heating, to change the operation mode from the internal cycle mode to the heating mode. In consequence, it is possible to eliminate or reduce the noise generated in opening the solenoid valve 21 for the heating, when the operation mode changes from the internal cycle mode to the heating mode.

Furthermore, also in the noise improvement control of this case, the controller 32 stops the compressor 2, and hence the pressure on the refrigerant upstream side of the solenoid valve 21 for the heating further immediately lowers, so that it is possible to further effectively reduce the difference ΔPox between the pressure before the solenoid valve 21 and the pressure after the valve.

Additionally, the controller 32 stops the compressor 2, reduces the difference ΔPox between the pressure before the solenoid valve 21 and the pressure after the valve to the predetermined value A or less, and then opens the solenoid valve 21. Consequently, it is possible to further securely eliminate or inhibit the generation of the noise due to the difference between the pressure before the solenoid valve 21 and the pressure after the valve.

It is to be noted that in the above noise improvement control of the embodiment, when the controller 32 reduces the difference ΔPox between the pressure before the solenoid valve 21 for the heating and the pressure after the valve to the predetermined value A or less, the controller opens the solenoid valve 21 and starts the compressor 2. However, also in this case, as shown by a broken line in FIG. 12, after the elapse of the above-mentioned predetermined time t1 from when the compressor 2 is stopped, the controller may open the solenoid valve 21, and start the compressor 2. Furthermore, the controller 32 may similarly decrease the number of revolution Nc of the compressor 2 also in the above noise improvement control of the embodiment.

(11) Changing Control of Predetermined Value A and Predetermined Value B by Velocity VSP Furthermore, the controller 32 changes the above-mentioned predetermined value A of the pressure difference ΔPox and the predetermined value B of the pressure ΔPce on the basis of the velocity VSP obtained from the velocity sensor 52, to increase the predetermined value, as the velocity VSP is higher. In a situation where the velocity VSP is high, the noise generated in opening the solenoid valve 21 or 22 is hardly a concern. Therefore, the controller 32 increases the predetermined value A or B of the difference ΔPox or ΔPce between the pressure before the solenoid valve 21 or 22 and the pressure after the valve, as the velocity VSP is higher.

Consequently, in the situation where the noise generated in opening the solenoid valve 21 or 22 is hardly the concern, the controller can increase the predetermined value A or B to open the solenoid valve 21 or 22 in an early stage, and hence it is possible to immediately change the operation mode.

(12) Changing Control of Predetermined Value A and Predetermined Value B by Volume of Air of Indoor Blower 27

Furthermore, in a situation where a volume of the air of the indoor blower 27 which is to be supplied to the air flow passage 3 is large, the noise in opening the solenoid valve is hardly the concern. Therefore, the controller 32 increases the predetermined value A or B of the difference ΔPox or ΔPce between the pressure before the solenoid valve 21 or 22 and the pressure after the valve, as the volume of the air is larger, on the basis of an operating situation of the indoor blower 27.

Consequently, also in such a situation where the volume of the air of the indoor blower 27 is large and the noise generated in opening the solenoid valve 21 or 22 is hardly the concern, the controller 32 can open the solenoid valve 21 or 22 in the early stage, and hence it is similarly possible to immediately change the operation mode.

(13) Control of Indoor Blower 27 and Outdoor Blower 15 During Change of Operation Mode It is to be noted that when the controller 32 changes the operation mode as described above, the controller may increase the volume of the air of the indoor blower 27 or a volume of air of the outdoor blower 15. According to such control, it is possible to achieve the situation where the noise generated in opening the solenoid valve 21 or 22 is hardly the concern.

(14) Determination to perform Noise Improvement Control by Velocity VSP or Volume of Air of Indoor Blower 27

Furthermore, the controller 32 does not have to execute the above-mentioned noise improvement control, when the velocity VSP has a predetermined value or more and/or when the volume of the air of the indoor blower 27 has a predetermined value or more. When the velocity VSP is high or the volume of the air of the indoor blower 27 is large, the noise generated in opening the solenoid valve 21 or 22 is hardly the concern.

Thus, when the controller 32 does not perform the above-mentioned noise improvement control in such a situation, the controller can immediately open the solenoid valve 21 or 22, and both of discomfort due to the noise and delay in changing the operation mode are avoidable.

Embodiment 2

Figure 13:
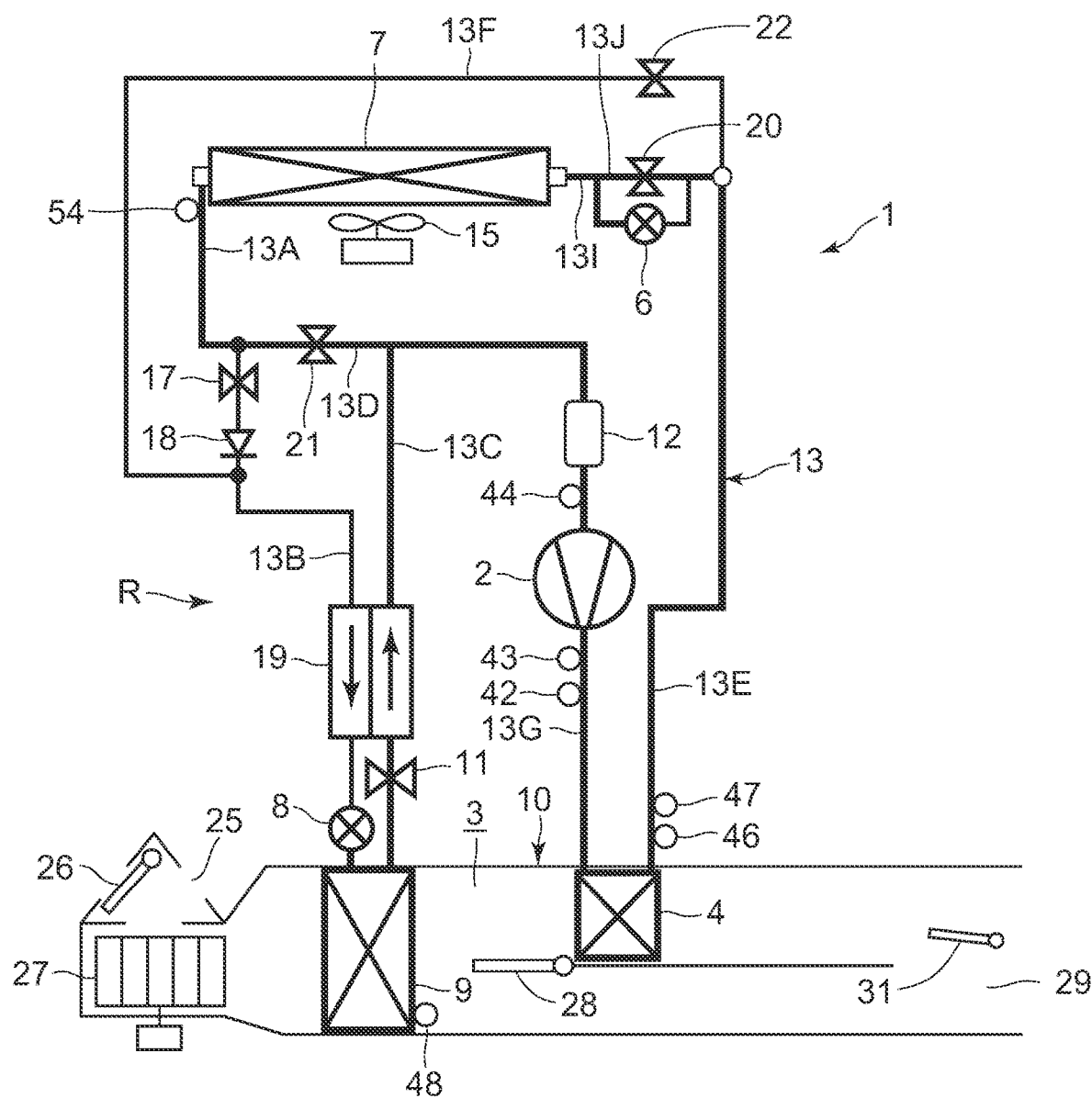
FIG. 13 is a constitutional view of an air conditioner for a vehicle of another embodiment to which the present invention is applicable (Embodiment 2).

Next, FIG. 13 shows another constitutional view of the air conditioner for the vehicle 1 of the present invention. In this embodiment, a receiver drier portion 14 and a subcooling portion 16 are not provided in an outdoor heat exchanger 7, and a refrigerant pipe 13A extending out from the outdoor heat exchanger 7 is connected to a refrigerant pipe 13B via a solenoid valve 17 and a check valve 18. Furthermore, a refrigerant pipe 13D branching from the refrigerant pipe 13A is similarly connected to a refrigerant pipe 13C on a downstream side of an internal heat exchanger 19 via a solenoid valve 21.

The other constitution is similar to the example of FIG. 1. The present invention is also effective in the air conditioner for the vehicle 1 of a refrigerant circuit R employing the outdoor heat exchanger 7 which does not have the receiver drier portion 14 and the subcooling portion 16 in this manner.

It is to be noted that the constitution of the refrigerant circuit R or each numeric value described above in each embodiment does not restrict the present invention, and is changeable without departing from the gist of the present invention.

DESCRIPTION OF REFERENCE NUMERALS 1 air conditioner for a vehicle
2 compressor
3 air flow passage
4 radiator
6 outdoor expansion valve
7 outdoor heat exchanger
8 indoor expansion valve
9 heat absorber
11 evaporation capability control valve
17, 20, 21 and 22 solenoid valve (opening/closing valve)
27 indoor blower (a blower fan)
32 controller (a control means)
43 discharge temperature sensor
44 suction temperature sensor
46 radiator temperature sensor
47 radiator pressure sensor
48 heat absorber temperature sensor
54 outdoor heat exchanger temperature sensor
R refrigerant circuit

The invention claimed is:
1. An air conditioner for a vehicle which comprises:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
a heat absorber to let the refrigerant absorb heat, thereby cooling the air to be supplied from the air flow passage to the vehicle interior,
an outdoor heat exchanger disposed outside the vehicle interior to let the refrigerant radiate heat or absorb heat, and
a controller,
wherein the controller changes and executes at least operation modes of:
a dehumidifying and heating mode to let the refrigerant discharged from the compressor radiate heat in the radiator, decompress the refrigerant from which the heat has been radiated, and let the refrigerant absorb heat in the heat absorber and the outdoor heat exchanger,
a dehumidifying and cooling mode to let the refrigerant discharged from the compressor radiate heat in the radiator and the outdoor heat exchanger, decompress the refrigerant from which the heat has been radiated, and let the refrigerant absorb heat in the heat absorber, and
a cooling mode to let the refrigerant discharged from the compressor radiate heat in the outdoor heat exchanger, decompress the refrigerant from which the heat has been radiated, and let the refrigerant absorb heat in the heat absorber,
the air conditioner for the vehicle further comprising:
an opening/closing valve for heating which is connected to an outlet side of the outdoor heat exchanger and is opened in the dehumidifying and heating mode, and an opening/closing valve for dehumidifying which is connected in parallel with the outdoor heat exchanger and is opened in the dehumidifying and heating mode;
wherein when the controller changes an operation mode from the cooling mode and/or the dehumidifying and cooling mode to the dehumidifying and heating mode, the controller executes noise improvement control to reduce a difference between a pressure before each opening/closing valve and a pressure after the opening/closing valve and then, after reducing the difference in the pressure, to open the opening/closing valve,
wherein execution of the noise improvement control comprises decreasing a number of revolution of the compressor, reducing the difference between the pressure before the opening/closing valve and the pressure after the opening/closing valve to a predetermined value or less, and, after the difference between the pressure before the opening/closing valve and the pressure after the opening/closing valve has been reduced to a predetermined value or less, opening the opening/closing valve, and
wherein the controller increases the predetermined value of the difference between the pressure before the opening/closing valve and the pressure after the opening/closing valve, as a velocity of the vehicle is higher.

2. An air conditioner for a vehicle which comprises:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
a heat absorber to let the refrigerant absorb heat, thereby cooling the air to be supplied from the air flow passage to the vehicle interior,
an outdoor heat exchanger disposed outside the vehicle interior to let the refrigerant radiate heat or absorb heat, and
a controller,
wherein the controller changes and executes at least operation modes of:
an internal cycle mode to let the refrigerant discharged from the compressor radiate heat in the radiator, decompress the refrigerant from which the heat has been radiated, and let the refrigerant absorb heat in the heat absorber,
a dehumidifying and cooling mode to let the refrigerant discharged from the compressor radiate heat in the radiator and the outdoor heat exchanger, decompress the refrigerant from which the heat has been radiated, and let the refrigerant absorb heat in the heat absorber, and
a cooling mode to let the refrigerant discharged from the compressor radiate heat in the outdoor heat exchanger, decompress the refrigerant from which the heat has been radiated, and let the refrigerant absorb heat in the heat absorber,
the air conditioner for the vehicle further comprising an opening/closing valve for dehumidifying which is connected in parallel with the outdoor heat exchanger and is opened in the internal cycle mode;
wherein when the controller changes an operation mode from the cooling mode and/or the dehumidifying and cooling mode to the internal cycle mode, the controller executes noise improvement control to reduce a difference between a pressure before the opening/closing valve and a pressure after the opening/closing valve and then, after reducing the difference in the pressure, to open the opening/closing valve,
wherein execution of the noise improvement control comprises decreasing a number of revolution of the compressor, reducing the difference between the pressure before the opening/closing valve and the pressure after the opening/closing valve to a predetermined value or less, and, after the difference between the pressure before the opening/closing valve and the pressure after the opening/closing valve has been reduced to the predetermined value or less, opening the opening/closing valve, and
wherein the controller increases the predetermined value of the difference between the pressure before the opening/closing valve and the pressure after the opening/closing valve, as a velocity of the vehicle is higher.
3. An air conditioner for a vehicle which comprises:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
a heat absorber to let the refrigerant absorb heat, thereby cooling the air to be supplied from the air flow passage to the vehicle interior,
an outdoor heat exchanger disposed outside the vehicle interior to let the refrigerant radiate heat or absorb heat, and
a controller,
wherein the controller changes and executes at least operation modes of:
a heating mode to let the refrigerant discharged from the compressor radiate heat in the radiator, decompress the refrigerant from which the heat has been radiated, and let the refrigerant absorb heat in the outdoor heat exchanger,
a dehumidifying and cooling mode to let the refrigerant discharged from the compressor radiate heat in the radiator and the outdoor heat exchanger, decompress the refrigerant from which the heat has been radiated, and let the refrigerant absorb heat in the heat absorber, and
a cooling mode to let the refrigerant discharged from the compressor radiate heat in the outdoor heat exchanger, decompress the refrigerant from which the heat has been radiated, and let the refrigerant absorb heat in the heat absorber,
the air conditioner for the vehicle further comprising an opening/closing valve for heating which is connected to an outlet side of the outdoor heat exchanger and is opened in the heating mode;
wherein when the controller changes an operation mode from the cooling mode and/or the dehumidifying and cooling mode to the heating mode, the controller executes noise improvement control to reduce a difference between a pressure before the opening/closing valve and a pressure after the opening/closing valve and then, after reducing the difference in the pressure, to open the opening/closing valve,
wherein execution of the noise improvement control comprises decreasing a number of revolution of the compressor, reducing the difference between the pressure before the opening/closing valve and the pressure after the opening/closing valve to a predetermined value or less, and, after the difference between the pressure before the opening/closing valve and the pressure after the opening/closing valve has been reduced to the predetermined value or less, opening the opening/closing valve, and
wherein the controller increases the predetermined value of the difference between the pressure before the opening/closing valve and the pressure after the opening/closing valve, as a velocity of the vehicle is higher.
4. An air conditioner for a vehicle which comprises:
a compressor to compress a refrigerant,
an air flow passage through which air to be supplied to a vehicle interior flows,
a radiator to let the refrigerant radiate heat, thereby heating the air to be supplied from the air flow passage to the vehicle interior,
a heat absorber to let the refrigerant absorb heat, thereby cooling the air to be supplied from the air flow passage to the vehicle interior,
an outdoor heat exchanger disposed outside the vehicle interior to let the refrigerant radiate heat or absorb heat, and
a controller,
wherein the controller changes and executes at least operation modes of:

a heating mode to let the refrigerant discharged from the compressor radiate heat in the radiator, decompress the refrigerant from which the heat has been radiated, and let the refrigerant absorb heat in the outdoor heat exchanger, a dehumidifying and heating mode to let the refrigerant discharged from the compressor radiate heat in the radiator, decompress the refrigerant from which the heat has been radiated, and let the refrigerant absorb heat in the heat absorber and the outdoor heat exchanger, and an internal cycle mode to let the refrigerant discharged from the compressor radiate heat in the radiator, decompress the refrigerant from which the heat has been radiated, and let the refrigerant absorb heat in the heat absorber, the air conditioner for the vehicle further comprising an opening/closing valve for heating which is connected to an outlet side of the outdoor heat exchanger and is opened in the heating mode and the dehumidifying and heating mode;

wherein when the controller changes an operation mode from the internal cycle mode to the heating mode and/or the dehumidifying and heating mode, the controller executes noise improvement control to reduce a difference between a pressure before the opening/closing valve and a pressure after the opening/closing valve and then, after reducing the difference in the pressure, to open the opening/closing valve, wherein execution of the noise improvement control comprises decreasing a number of revolution of the compressor, reducing the difference between the pressure before the opening/closing valve and the pressure after the opening/closing valve to a predetermined value or less, and, after the difference between the pressure before the opening/closing valve and the pressure after the opening/closing valve has been reduced to the predetermined value or less, opening the opening/closing valve, and wherein the controller increases the predetermined value of the difference between the pressure before the opening/closing valve and the pressure after the opening/closing valve, as a velocity of the vehicle is higher.

5. The air conditioner for the vehicle according to claim 1, further comprising an indoor blower to supply the air to the air flow passage;

wherein the controller increases the predetermined value of the difference between the pressure before the opening/closing valve and the pressure after the opening/closing valve, as a volume of the air of the indoor blower is larger.

6. The air conditioner for the vehicle according to claim 1, further comprising an indoor blower to supply the air to the air flow passage, and an outdoor blower to pass outdoor air through the outdoor heat exchanger;

wherein when the controller changes an operation mode, the controller increases a volume of the air of the indoor blower and/or the outdoor blower.

7. The air conditioner for the vehicle according to claim 1, further comprising an indoor blower to supply the air to the air flow passage;

wherein the controller does not execute the noise improvement control, when a velocity of the vehicle has a predetermined value or more and/or when a volume of the air of the indoor blower has a predetermined value or more.

* * * * *